United States Patent
Farahat et al.

(10) Patent No.: US 10,109,122 B2
(45) Date of Patent: Oct. 23, 2018

(54) SYSTEM FOR MAINTENANCE RECOMMENDATION BASED ON MAINTENANCE EFFECTIVENESS ESTIMATION

(71) Applicant: Hitachi, Ltd., Tokyo (JP)

(72) Inventors: Ahmed Khairy Farahat, Santa Clara, CA (US); Chetan Gupta, San Mateo, CA (US); Hsiu-Khuern Tang, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/135,946

(22) Filed: Apr. 22, 2016

(65) Prior Publication Data
US 2017/0309094 A1 Oct. 26, 2017

(51) Int. Cl.
G07C 5/08 (2006.01)
G06Q 10/06 (2012.01)
G07C 5/00 (2006.01)

(52) U.S. Cl.
CPC .......... *G07C 5/0841* (2013.01); *G06Q 10/06* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2004/0102937 A1* | 5/2004 | Ibrahim | ............... | G05B 13/048 703/2 |
| 2011/0061015 A1* | 3/2011 | Drees | .................... | G05B 15/02 715/771 |
| 2014/0074730 A1* | 3/2014 | Arensmeier | ......... | F24F 11/0086 705/305 |
| 2014/0278165 A1* | 9/2014 | Wenzel | .................. | G06Q 50/08 702/61 |

OTHER PUBLICATIONS

Kissock et al., Inverse Modeling Toolkit: Numerical Algorithms, 2003, Ashrae Annual Meeting, pp. 1-9 (Year: 2003).*
Dey et al., Discriminating Among the Log-Normal, Weibull, and Generalized Exponential Distributions, Sep. 2, 2009, IEEE Transactions on Reliability, vol. 58, No. 3, pp. 416-424 (Year: 2009).*
Lammers et al., Measuring Progress with Normalized Energy Intensity, 2011, SAE International, Department of Mechanical and Aerospace Engineering, University of Dayton, Dayton, Ohio, pp. 1-11 (Year: 2011).*
Razali et al., "Power comparisons of Shapiro-Wilk, Kolmogorov-Smirnov, Lilliefors and Anderson-Darling tests", 2011, Journal of Statistical Modeling and Analytics, vol. 2, No. 1, p. 21-33 (Year: 2011).*

* cited by examiner

*Primary Examiner* — Tamara L Weber
(74) *Attorney, Agent, or Firm* — Procopio, Cory, Hargreaves & Savitch LLP

(57) ABSTRACT

Example implementations described herein are directed to a decision-support system for maintenance recommendation that uses analytics technology to evaluate the effectiveness of a maintenance action or a group of actions in improving (Continued)

the performance of equipment and its components, and provide recommendations on which maintenance actions or a group of maintenance actions should be pursued and which should be avoided.

6 Claims, 24 Drawing Sheets

| Equipment Group ID | Equipment |
|---|---|
| G1 | E1, E2, E4.... |
| G2 | E1, E2,..... |
| G3 | E3, E5...... |

FIG. 12(a)

| Equipment | Type | ... | Manufacturer |
|---|---|---|---|
| E1 | T1 | ... | M1 |
| E2 | T1 | ... | M2 |
| E3 | T2 | ... | M1 |

FIG. 12(b)

| Equipment | Maintenance ID | ... | Type/Date/Operator |
|---|---|---|---|
| E1 | M1 | ... | TDO1 |
| E1 | M2 | ... | TDO2 |
| E2 | M3 | ... | TDO3 |

FIG. 12(c)

| Equipment | Attribute | ... | Value | Timestamp |
|---|---|---|---|---|
| E1 | A1 | ... | V1 | T1 |
| E2 | A2 | ... | V2 | T2 |
| E3 | A3 | ... | V3 | T3 |

FIG. 13(a)

| KPI | Function |
|---|---|
| K1 | F1 |
| K2 | F2 |
| K3 | F3 |

FIG. 13(b)

SYSTEM FOR MAINTENANCE RECOMMENDATION BASED ON MAINTENANCE EFFECTIVENESS ESTIMATION

BACKGROUND

Field

The present disclosure is generally related to computer systems, and more specifically, to application of data analytics for monitoring effectiveness of maintenance actions.

Related Art

Maintenance is a process with an objective of keeping the equipment in a working, efficient and cost-effective condition. The maintenance process is conducted by performing the necessary actions on the equipment to achieve one or more of these objectives. These actions include, but are not limited to, the inspection, tuning, repair and overhaul of the equipment or its components. Equipment maintenance can be conducted in one of the following strategies:

(a) Corrective Maintenance: Corrective maintenance involves taking corrective actions after the equipment or one of its components fails in order to retain its working status. As this strategy waits for the equipment to fail before taking a maintenance action, corrective maintenance can result in decreasing the availability of the equipment. In addition, performing corrective actions after the occurrence of equipment failure may be more expensive and time-consuming.

(b) Preventive maintenance (also known as time-based maintenance): Preventive maintenance involves performing maintenance actions on a regular basis regardless of the condition of the equipment. In related art systems, preventive maintenance may be the most commonly followed strategy for equipment maintenance. Preventive maintenance avoids the limitations of corrective maintenance by performing periodic maintenance actions (e.g., periodic replacement of parts). However, preventive maintenance can be very expensive as most of the periodic maintenance actions are done while the equipment is in a good condition. Such maintenance could have been avoided if the actual condition of the equipment is known while planning for maintenance. Moreover, the equipment is still prone to unexpected failures that might happen due to abnormal usage patterns or environmental conditions between maintenance actions.

(c) Predictive Maintenance (also known as condition-based maintenance): Predictive maintenance can involve continually monitoring the condition of the equipment to determine the maintenance actions need to be taken at certain times. Predictive maintenance can reduce the chance of unexpected failures, increase the equipment availability, and accordingly decrease the overall cost of the maintenance process.

SUMMARY

Example implementations are directed to a system for estimating the effectiveness of maintenance actions and categories in improving key performance indicators.

Aspects of the present disclosure can include a method, which can involve processing a first maintenance action for one or more equipment; obtaining sensor data of the one or more equipment before and after one or more second maintenance actions that is a same type as the first maintenance action; determining an overall performance impact of the first maintenance action based on a comparison of one or more first performance determinations from the sensor data occurring before the one or more second maintenance actions and one or more second performance determinations from the sensor data occurring after the one or more second maintenance actions; and transmitting the overall performance impact.

Aspects of the present disclosure can include a non-transitory computer readable medium, storing instructions for executing a process which can involve processing a first maintenance action for one or more equipment; obtaining sensor data of the one or more equipment before and after one or more second maintenance actions that is a same type as the first maintenance action; determining an overall performance impact of the first maintenance action based on a comparison of one or more first performance determinations from the sensor data occurring before the one or more second maintenance actions and one or more second performance determinations from the sensor data occurring after the one or more second maintenance actions; and transmitting the overall performance impact.

Aspects of the present disclosure can include an apparatus, which can involve a processor, configured to process a first maintenance action for one or more equipment; obtain sensor data of the one or more equipment before and after one or more second maintenance actions that is a same type as the first maintenance action; determine an overall performance impact of the first maintenance action based on a comparison of one or more first performance determinations from the sensor data occurring before the one or more second maintenance actions and one or more second performance determinations from the sensor data occurring after the one or more second maintenance actions; and transmit the overall performance impact.

Aspects of the present disclosure can include an apparatus, which can involve means for processing a first maintenance action for one or more equipment; means for obtaining sensor data of the one or more equipment before and after one or more second maintenance actions that is a same type as the first maintenance action; means for determining an overall performance impact of the first maintenance action based on a comparison of one or more first performance determinations from the sensor data occurring before the one or more second maintenance actions and one or more second performance determinations from the sensor data occurring after the one or more second maintenance actions; and means for transmitting the overall performance impact.

The present disclosure also involves a system for predictive maintenance of equipment using data-driven performance degradation modelling and monitoring. Example implementations of the present disclosure detect degradation in performance over a long period of time (e.g., months or years), and alert the user when degradation occurs. Example implementations differ from anomaly detection which detects abrupt changes in raw signals over a short period of time.

The present disclosure also presents a system for predictive maintenance using performance degradation modeling and monitoring. The users of the example implementations of the present disclosure can include, but are not limited to equipment end-users and/or operators, maintenance personnel and management, data analysts and decision-support personnel, decision makers and operation managers, and equipment designers and manufacturers. The example implementations of the present disclosure can be utilized to gain insight into the current condition of the equipment as well as its individual components, early detect pre-failure conditions as well as inefficient and cost-ineffective operations of the equipment, save money and labor by planning ahead for maintenance actions as needed, avoid unexpected failures and increase equipment availability, eliminate unnecessary maintenance actions, and accordingly save parts and labor cost, and optimize cost and manpower for the maintenance process, by gaining insights into the actual components that require maintenance.

Example implementations of the present disclosure can be used as a standalone solution or be integrated with existing systems that provide other functionalities for predictive maintenance. The individual modules of the present disclosure can also be integrated as a module in other functionalities for predictive maintenance such as anomaly detection and event prediction.

Aspects of the present disclosure include a method, which may involve deriving an ideal density function for a first key performance indicator (KPI) value of an apparatus, based on historical sensor data of the apparatus; and deriving a first model relating a first KPI value to a load of the apparatus based on the historical sensor data of the apparatus. For the apparatus providing sensor data, the method may also involve deriving a second KPI value from the sensor data of the apparatus corresponding to the first KPI value; normalizing the second KPI value based on the first model and a present load to the apparatus; deriving a density function on the normalized second KPI value; and for a cumulative probability of the second KPI value falling above a threshold value determined based on the ideal density function of the first KPI, provide a maintenance alert based on the threshold value.

Aspects of the present disclosure include a non-transitory computer readable medium storing instructions for executing a process. The instructions may involve deriving an ideal density function for a first key performance indicator (KPI) value of an apparatus, based on historical sensor data of the apparatus; and deriving a first model relating a first KPI value to a load of the apparatus based on the historical sensor data of the apparatus. For the apparatus providing sensor data, the instructions may also involve deriving a second KPI value from the sensor data of the apparatus corresponding to the first KPI value; normalizing the second KPI value based on the first model and a present load to the apparatus; deriving a density function on the normalized second KPI value; and for a cumulative probability of the second KPI value falling above a threshold value determined based on the ideal density function of the first KPI, provide a maintenance alert based on the threshold value.

Aspects of the present disclosure may further include a computing device communicatively coupled to a plurality of sensors of an apparatus. The computing device may involve a memory configured to store historical sensor data of the apparatus; and a processor, configured to derive an ideal density function for a first key performance indicator (KPI) value of the apparatus, based on the historical sensor data of the apparatus; and derive a first model relating a first KPI value to a load of the apparatus based on the historical sensor data of the apparatus. For the apparatus providing sensor data, the computing device may further be configured to derive a second KPI value from the sensor data of the apparatus corresponding to the first KPI value; normalize the second KPI value based on the first model and a present load to the apparatus; derive a density function on the normalized second KPI value; and for a cumulative probability of the second KPI value falling above a threshold value determined based on the ideal density function of the first KPI, provide a maintenance alert based on the threshold value.

BRIEF DESCRIPTION OF DRAWINGS

FIGS. 12(a) to 12(c) illustrate example management information that example implementations may utilize to facilitate the functionality of the present disclosure.

FIGS. 13(a) and 13(b) illustrate example management information that example implementations may utilize to facilitate the functionality of the present disclosure.

DETAILED DESCRIPTION

Figure 1A:
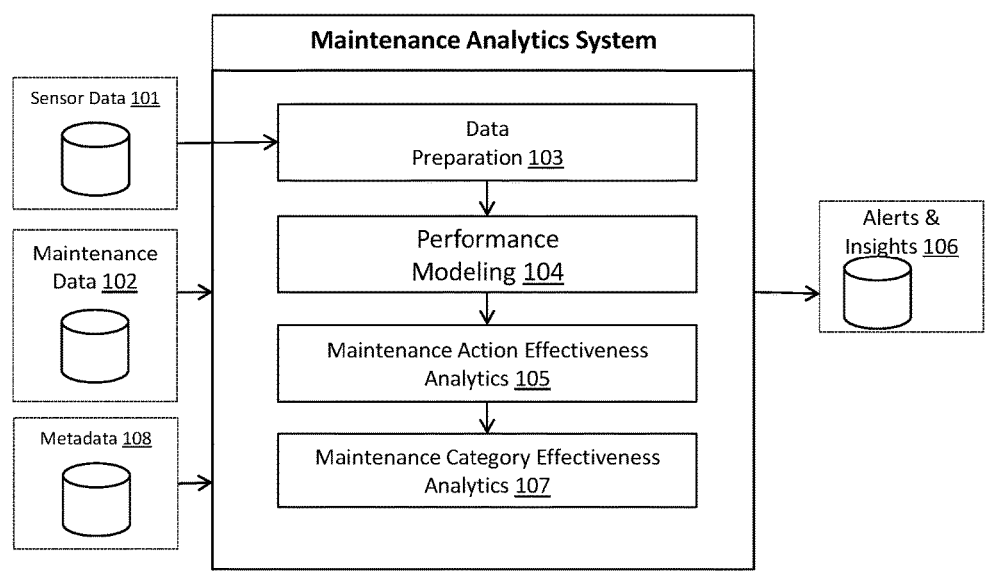
FIG. 1(a) illustrates an example data flow diagram for the maintenance analytics system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In related art implementations for systems configured to track maintenance actions, maintenance actions for particular equipment can be logged. However, the related art implementations do not provide any indication as to the effectiveness of such maintenance actions, only that such maintenance actions were conducted. Thus, the related art implementations may mislead operators to continue performing ineffective maintenance actions on equipment without realizing that a particular maintenance action is ineffective. Example implementations provided herein are directed to providing a maintenance action tracking system that employs a technical solution to measure and indicate the effectiveness of a particular maintenance action to address the lack of effectiveness measurements of maintenance actions in the related art maintenance tracking systems.

Example implementations of the present disclosure are directed to a system for maintenance recommendation through the estimation of the effectiveness of maintenance actions and categories. The example implementations can be applied to, but are not limited to equipment end-users and/or operators, maintenance personnel and management, data analysts and decision-support personnel, decision makers and operation managers, equipment designers and manufacturers and so on.

The functions provided through the example implementations can involve, but are not limited to determining if a maintenance action achieved the target performance improvement, eliminating unnecessary maintenance actions, and accordingly save parts and labor cost, discovering which maintenance types are unnecessary for a fleet of equipment, exploring which maintenance company/staff is providing the best service and discovering if maintenance is effective for old equipment and whether a replacement is more cost-effective.

Example implementations can be used as a standalone solution or be integrated with existing systems that provide other functionalities for maintenance management and optimization.

In all maintenance scenarios, the maintenance staff monitors feedback about the past and ongoing maintenance actions, and the effectiveness of the maintenance actions in keeping the equipment in the desired condition. By knowing, for instance, that a particular maintenance action (e.g., conducting tire rotation on Truck A on May 26, 2010) did not improve the performance of some component of the equipment as desired (e.g., improving fuel consumption of Truck A), the maintenance staff will be able to quickly implement an effective countermeasure (e.g., change vendors for tire maintenance). Maintenance management may also desire to track whether a type of maintenance action (e.g. fuel pipe cleaning) is effective in enhancing the performance of a particular fleet of equipment (e.g. such as reducing the gas consumption of a fleet of trucks), or whether a maintenance vendor is performing the maintenance correctly compared to other vendors. By learning these insights based on actual measurements from the equipment, maintenance operators and their management can improve day-to-day maintenance actions and revise the maintenance process for a fleet of equipment (e.g., decide what to do, change provider). These informative decisions can result in enhancing maintenance quality, reducing maintenance cost, increasing equipment availability and reducing equipment failure rate.

Example implementations are directed to a systematic approach for maintenance analytics that evaluates the effectiveness of a maintenance action or a group of actions in improving the performance of equipment and its components. The approach of the example implementations described herein depends on first capturing actual measurements from the equipment that reflect its performance before and after each maintenance action and then estimating the statistical significances of the performance improvements. Such individual comparisons between before and after performance are then aggregated to make conclusions about groups of actions (actions from one type, by one vendor, in some location, etc.).

Example implementations are also directed to a predicative maintenance approach to monitor the performance of the equipment and then issue an alarm for a maintenance action to the maintenance staff based on the observed performance level. In conjunction with the maintenance analytics implementations as described herein, the maintenance staff can thereby be alerted of a needed maintenance action, and then determine which maintenance action will improve performance, and which maintenance action will cause performance degradation.

Predictive maintenance approaches can depend on encoding information about pre-failure conditions of the equipment and then monitoring real-time sensor and event data searching for these conditions. The information about pre-failure conditions can be: (a) rule-based (e.g., "$C_1<10$, and $B_4>1000$ for more than 10 hours") or (b) model-based (e.g., "a simulation of the normal behavior of the equipment"). Based on how this information can be obtained, predictive maintenance approaches can be classified into:

(a) Knowledge-driven approaches: In knowledge-driven approaches, information about pre-failure conditions (rules or models) is manually encoded by the equipment manufacturer or other experts in the equipment domain. Knowledge-driven approaches may be limited to the knowledge of domain experts about possible patterns of pre-failure conditions. For complex equipment, the actual behavior of the equipment can oftentimes be different from any simulation models or pre-defined rules.

(b) Data-driven approaches: In data-driven approaches, information about pre-failure conditions (rules or models) is learned from historical sensor data and event logs. One category of data-driven approaches depends on classification techniques to learn complex rules for failure detection from examples of failures that happened in the past. This category is supervised and requires the availability of sufficient examples of failures, which can be impractical for many types of equipment (e.g., aircrafts). A second category of approaches learns models of normal behaviors from historical data, and then detects any deviation from this normal behavior. This category is unsupervised as it does not require any examples of failures and accordingly is easier to develop. The example implementations may fall under the unsupervised category of data-driven approaches.

When learning behavior models from historical data, two distinct objectives can be achieved:

(a) Anomaly detection: Anomaly detection involves the detection of any abnormal behavior that happens during the operation of the equipment over a short time span (e.g., a few hours or days). Such anomalous behavior can involve a pre-failure condition that is flagged to be inspected by the maintenance staff, or an unusual condition in the equipment environment. These types of models are usually learned using a relatively small amount of normal data. Moreover, having an anomalous behavior does not necessarily mean that there is degradation in the equipment performance. These types of abnormal behaviors might happen during the early life of the equipment. In addition, when an abnormal behavior corresponds to a pre-failure condition, the behavior may happen shortly before the failure and therefore the gap between the times at which the abnormal behavior is detected and the actual failure can be relatively short (e.g., a few hours or days).

(b) Performance degradation detection: Performance degradation detection involves detection of slow degradation in the performance of the equipment. Slow degradation can be an early warning for some failure, or can reflect inefficient or cost-ineffective situations that may need to be addressed. The performance degradation models are learned over long periods of historical date (e.g., months or years), and the detection of a performance degradation requires the inspection of a relatively long time span (e.g., many days or even a few months). A continuous monitoring of performance degradation may result in an early enough warning for the maintenance staff to take actions to prevent a failure or restore the equipment to an efficient and cost-effective state.

Example implementations described herein are directed to implementations of performance degradation detection. Specifically, example implementations involve a systematic approach for performance analytics that detects degradation in equipment performance using sensor measurements from the equipment. In comparison to related art implementations on performance degradation modeling, example implementations of the present disclosure are directed to use by domain experts, rather than data scientists/analysts. Once linked to sensor data sources, the example implementations improve on the related art by only requiring the domain expert to define domain-level conditions for equipment operation, and performance indicators to start performance monitoring and analytics. Example implementations involve a probabilistic model for ideal performance from historical data and monitor recent and cumulative values of key performance indicators to detect deviation from the ideal performance.

FIG. 1(a) illustrates an example data flow diagram for the maintenance analytics system, in accordance with an example implementation. Example implementations of the present disclosure are configured to receive the following formats of input data:

(a) Sensor Data: Sensor data 101 can involve streaming and historical time series data collected from different sensors measuring desired metrics of components or other aspects of an apparatus. Each time series represent the readings of the sensor value every k minutes, where k can depends on the frequency by which data can be retrieved from a given sensor. The sampling rate k can have different values for different sensors. Each sensor reading is associated with a timestamp that specifies the date and time of the reading. The data can be collected from the sensor in batches, where each batch of data represents the sensor readings for a few days. Other time periods are possible depending on the desired implementation (e.g. a few hours). There might be gaps between batches. The gaps can be due to data being received late at the monitoring facilities, or data discarded by the equipment and not received at all. For instance, an example implementation to reduce communication may send data for two day batches every five days and discard the rest. The data collection frequency can also differ from one sensor to another.

(b) Maintenance data: Maintenance data 102 involves discrete events corresponding to maintenance actions that are relevant to the equipment domain. Maintenance data can also be provided as streaming data or historical data.

(c) Metadata: Metadata 108 involves data that describe extra information about the characteristic of the equipment and environment in which the equipment is installed. Such metadata can include, but is not limited to, the specifications of the equipment, operation conditions (e.g., operation hours), environment conditions (e.g., location, temperature, humidity), and the installation information (e.g., date). All these data can appear in structured, semi-structured or unstructured formats, and can be incorporated as streaming data or historical data.

The received data can be processed through a series of modules of the system architecture, according to the desired implementation. Example implementations of the modules can include the data preparation module 103, which is configured to prepare the raw sensor data by removing noise and identifying the subset of sensor data that can be utilized for further analysis. Further detail of the data preparation module 103 is provided in FIG. 2(a). The performance modeling module 104 is configured to mine historical sensor data (e.g. sensor data obtained in the past measuring desired metrics of sensors monitoring components or other aspects of an apparatus) and build performance models to quantify the performance of the equipment and its components. Further details of the performance modeling module 104 is provided in FIG. 4. The maintenance action effectiveness analytics module 105 is configured to monitor individual maintenance actions and determine the effectiveness of each action in improving the equipment performance. Further detail of the maintenance action effectiveness module 105 is provided in FIG. 8. The maintenance category effectiveness analytics module 107 is configured to monitor a group of maintenance actions and determine the effectiveness of this group in improving the equipment performance. Further detail of the maintenance category effectiveness analytics module 107 is provided in FIG. 11. The maintenance analytics system can be configured to provide information utilized as alerts and insights to the system at 106.

Figure 1B:
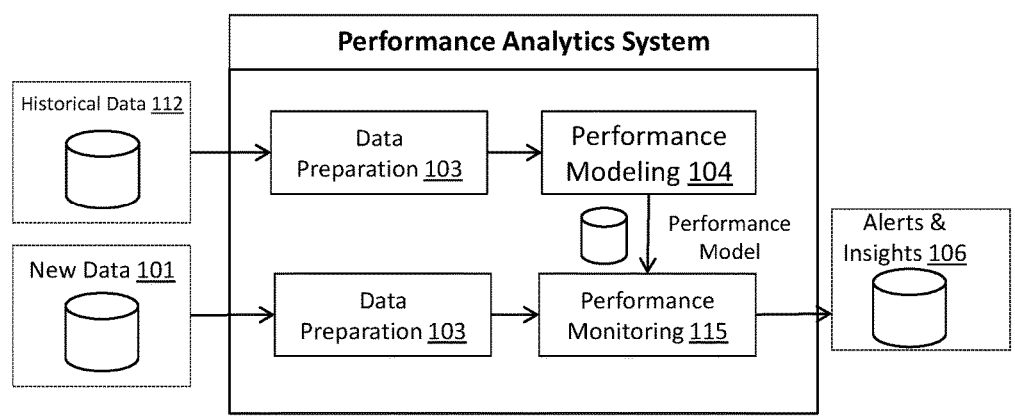
FIG. 1(b) illustrates an example data flow diagram for the performance analytics system, in accordance with an example implementation.

FIG. 1(b) illustrates another example data flow diagram for the performance analytics system, in accordance with an example implementation. Example implementations of the present disclosure are configured to receive the sensor data 101 and metadata 108 as described in FIG. 1(a) along with historical data 112 and event data. Event data involves maintenance data and other discrete events that are relevant to the equipment domain. Event data describes events that happened in the environment of the equipment. Such event data can include, but is not limited to, events that are parts of the equipment operation (e.g., start of operation), maintenance and check-up actions that were conducted on the equipment (e.g., part replacement, overhaul), external actions in the environment of the equipment (e.g., blackout, heat wave). Each event is associated with a time-stamp that specifies the date and, depending on the desired implementation, the time of the event. Event data can also be provided as streaming data (new data 101) or historical data 102.

The received data can be processed through a series of modules of the system architecture, according to the desired implementation. Example implementations of the modules can include the data preparation module 103, which is configured to prepare the raw sensor data by removing noise and identifying the subset of sensor data that can be utilized for further analysis. Further detail of the data preparation module 103 is provided in FIG. 2(a). The performance modeling module 104 is configured to mine historical sensor data (e.g. sensor data obtained in the past measuring desired metrics of sensors monitoring components or other aspects of an apparatus) and build performance models to quantify the performance of the equipment and its components. Further detail of the performance modeling module 104 is provided in FIG. 4 and FIG. 6(a). The performance monitoring module 115 is configured to monitor new sensor data and detect performance degradation in the equipment or any of its components. Further detail of the performance monitoring module 115 is provided in FIGS. 7(a) and 7(b). Performance monitoring provides information utilized as alerts and insights to the system at 106.

Figure 2A:
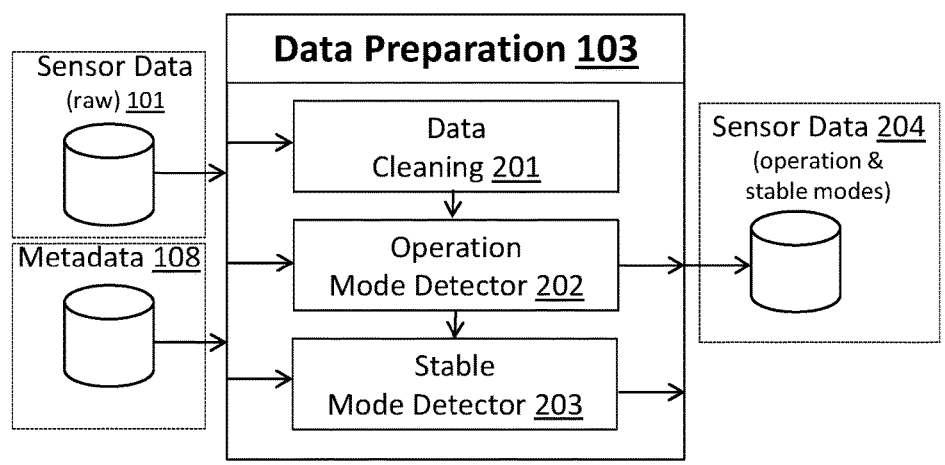
FIG. 2(a) illustrates a data preparation module, in accordance with an example implementation.

FIG. 2(a) illustrates a data preparation module, in accordance with an example implementation. The data preparation module 103 is configured to receive as input historical/new sensor data 101 along with metadata 108 about the equipment, and can include the following processes. Data cleaning 201 is a process configured to consolidate data from different streams and remove noise and outliers from the data. Operation mode detector 202 is a process configured to detect the operation mode of the equipment from the sensor data. Stable mode detector 203 is a process configured to detect parts of the time series that correspond to a state where the condition of the equipment is stable (i.e., does not experience changes beyond a desired threshold in sensor readings). Information regarding the operation mode 202 and the stable mode 203 is output by the data cleaning 201 along with the sensor data 204. In other words, the sensor data 101 can be augmented with information about the operation and stable mode to produce sensor data 204.

Figure 2B:
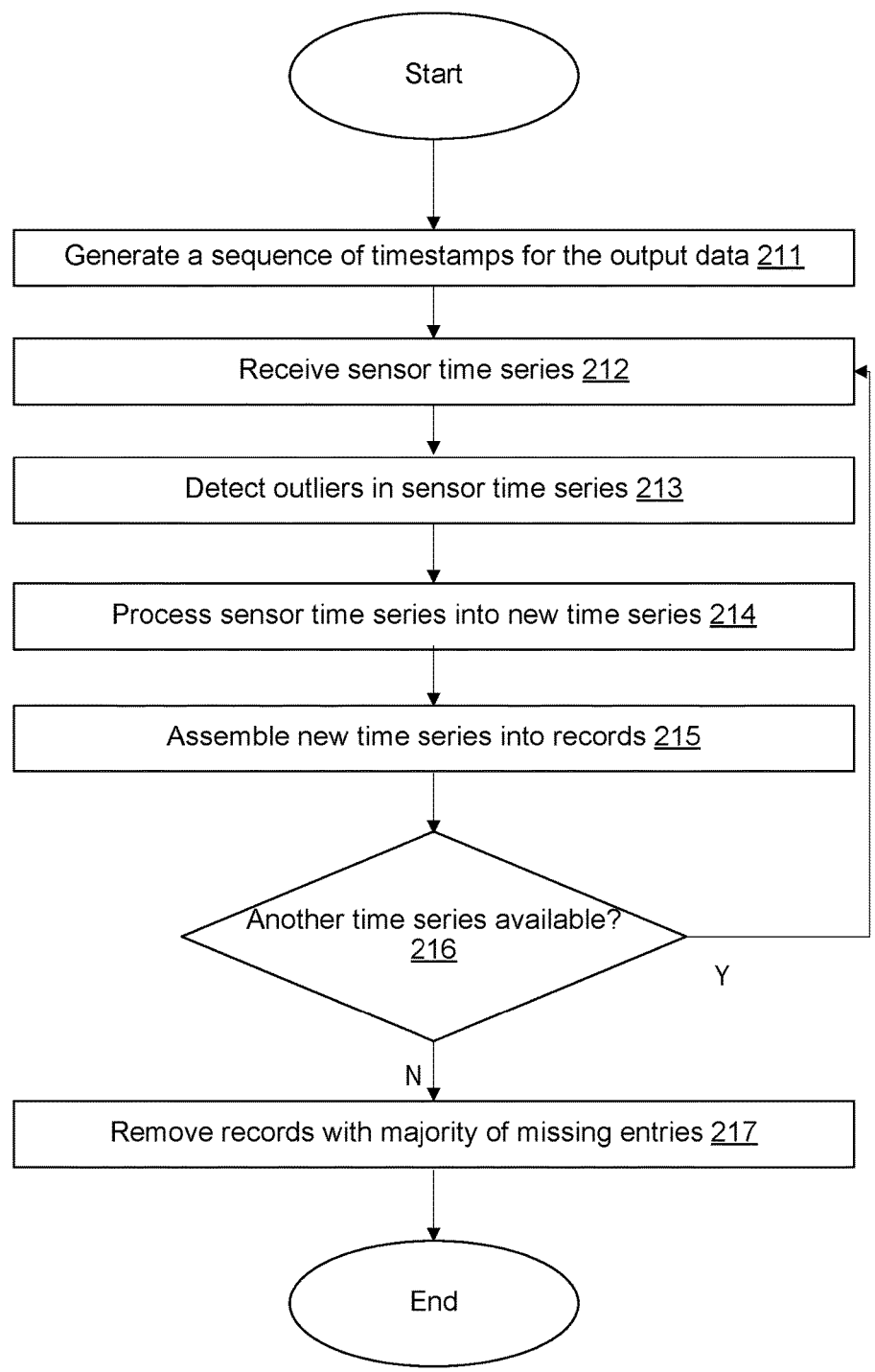
FIG. 2(b) illustrates a flow diagram for the data cleaning process, in accordance with an example implementation.

FIG. 2(b) illustrates a flow diagram for the data cleaning process 201, in accordance with an example implementation. Sensor data can be collected from different data streams (e.g., equipment sensors and weather data). Each time series might have a different sampling rate and the data might arrive in batches of different sizes. The data cleaning process 201 is configured to consolidate data from different sources and obtain data in a format relating sensors to sensor readings and timestamps. An example format can include a tabular format whose columns represent the sensors and each row represents the sensor readings at a unique timestamp, but is not limited thereto. In such an example, the rows are referred to as data records. The data cleaning process can then proceed in accordance with the flow diagram.

At 211, the data cleaning process 201 is configured to generate a common sequence of timestamps for the output data. The common sequence can be generated based on a fixed gap (e.g., every 5 minutes) or using the timestamps of one of the sensors (e.g., the one with the largest number of readings), depending on the desired implementation.

At 212, the data cleaning process 201 receives a sensor time series. At 213, the data cleaning submodule 201 detects outliers in the sensor reading. When an outlier is detected, the data cleaning process 201 can either remove the outlier or replace the outlier with values calculated based on other readings of the same sensor.

At 214, the data cleaning process 201 conducts processing for a given sensor time series. The processing of the sensor time series includes detection of outliers in the sensor readings and either remove the outliers or replace the outliers with values calculated based on other readings of the same sensor (e.g., average or median of nearest neighbors). The processing of the sensor time series may also include the estimation of the sensor values at each common timestamp by interpolating the readings of the sensor time series at nearby timestamps. The estimation can be conducted by learning a regression model for the original time series and finding the values of regression function at the common timestamps, or by other methods depending on the desired implementations.

At 215, the data cleaning process 201 assembles the new sensor time series into records. At 216, the data cleaning process 201 performs a check to determine if there is another sensor time series for processing. If so (Yes), then the flow proceeds back to 212, otherwise (No), the flow proceeds to 217 wherein the flow removes records having a majority of missing entries, and the sensor data is provided.

Table 1 below illustrates a sample output of the data cleaning process, in accordance with an example implementation.

TABLE 1

| Sensor data after data cleaning | | | |
| --- | --- | --- | --- |
| Time stamp | Sensor #1 | . . . | Sensor #m |
| 2000/05/01 5:10:00 AM | 5 | . . . | 100 |
| 2000/05/01 5:15:00 AM | 10 | . . . | 110 |
| 2000/05/01 5:20:00 AM | 10 | . . . | 112 |
| 2000/05/01 5:25:00 AM | 15 | . . . | 110 |
| 2000/05/01 5:30:00 AM | 15 | . . . | 110 |
| 2000/05/01 5:35:00 AM | 10 | . . . | 110 |
| . . . | . . . | . . . | . . . |

Figure 2C:
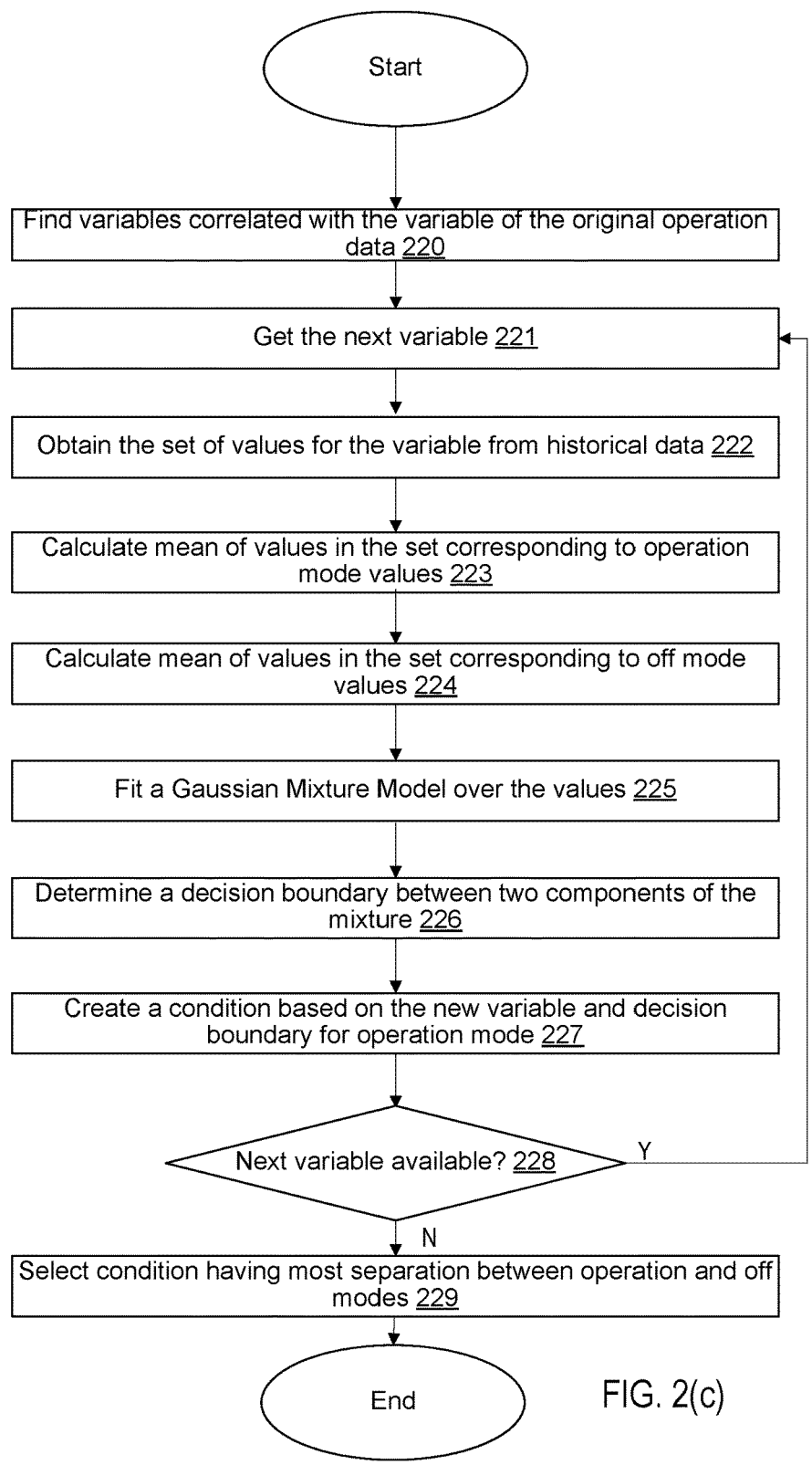
FIG. 2(c) illustrates an example flow diagram for the operation mode detector submodule, in accordance with an example implementation.

FIG. 2(c) illustrates an example flow diagram for the operation mode detector process 202, in accordance with an example implementation. The operation mode detector process 202 is configured to identify the periods during which the equipment is being operated. These periods are referred to as the "operation" mode. The periods during which the equipment is not being operated are referred to as the "off" mode. Information about the operation mode is represented in the metadata as conditions over sensor data (e.g., current>100 and temperature>40). These conditions are typically defined by the domain experts from the specifications given by the equipment manufacturer, and most of the time they do not accurately reflect the actual operation conditions of the equipment. In addition, the sensors included in these conditions might be noisy. This results in misidentifying periods during which the equipment is being operated. In order to avoid these limitations, example implementations utilize historical data to learn more accurate conditions for the operation mode.

Figure 3:
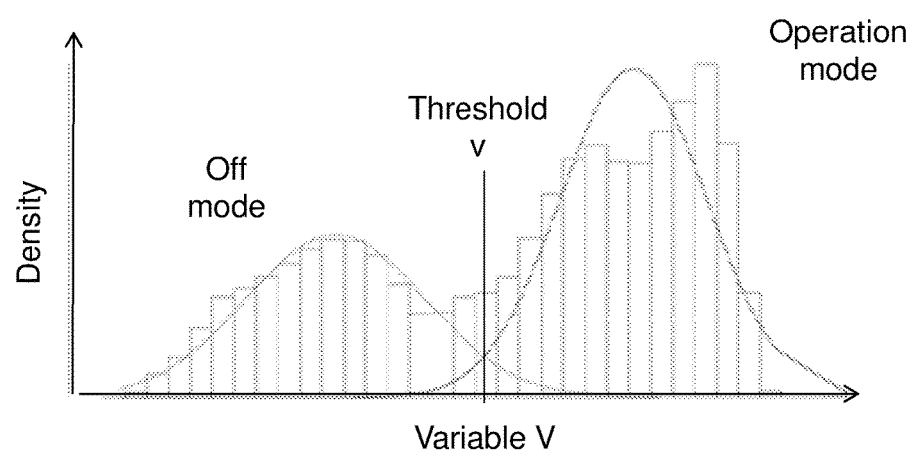
FIG. 3 shows an example of a GMM learned over historical sensor data of a variable correlated with the original variable specified in the metadata, through the flow diagram of FIG. 2(c).

Let "A≥a" be a condition defined by the domain expert for the operation mode, where "A" is a variable that corresponds to some sensor and "a" is a threshold value (A condition in the form of A≤a can be transformed to A'≥a' without loss of generality). The operation mode detector proceeds as follow:

At 220, the operation mode detector process 202 find variables "$\{B_1, \ldots B_r\}$" that have strong correlation with "A". Correlation can be defined by the domain expert based on the physical model of the equipment or learned using data-driven measures, or through other methods in accordance with the desired implementation. At 221, the operation mode detector process 202 processes each variable $V \in \{A, B_1 \ldots B_r\}$ from the original variable and variables identified at 220. At 222, the operation mode detector process 202 obtains the values of "V" from historical data. At 223, the operation mode detector process 202 calculates $m_1$ as the mean of the values of "V" that correspond to "A≥a" (operation mode values). At 224, the operation mode detector process 202 calculates $m_2$ as the mean of the values of "V" that correspond to "A<a" (off mode values). At 225, the operation mode detector process 202 fits a Gaussian Mixture Model (GMM) with two components over the values of "V", by using an iterative algorithm such as Expectation Maximization (EM) with initial means for the two mixtures equal to $m_1$ and $m_2$, or by other methods in accordance with the desired implementation. At 226, the operation mode detector process 202 determines a decision boundary "v" between the two mixtures for which p(v∈ "operation")>>p(v∈"off") At 227, the operation mode detector process 202 creates a new condition "V><=v" for "operation" mode (V≥v if $m_1$>$m_2$ or V≤v if $m_1$<$m_2$). At 228, if there are variables remaining for processing (Yes) then the flow reverts to 221 to process the next variable, otherwise (No) the flow proceeds to 229. At 229, the operation mode detector process 202 selects the condition "V><=v" which has the most separation between "operation" and "off" components. FIG. 3 shows an example of a GMM learned over historical sensor data of a variable correlated with the original variable specified in the metadata, through the flow diagram of FIG. 2(c).

Figure 2D:
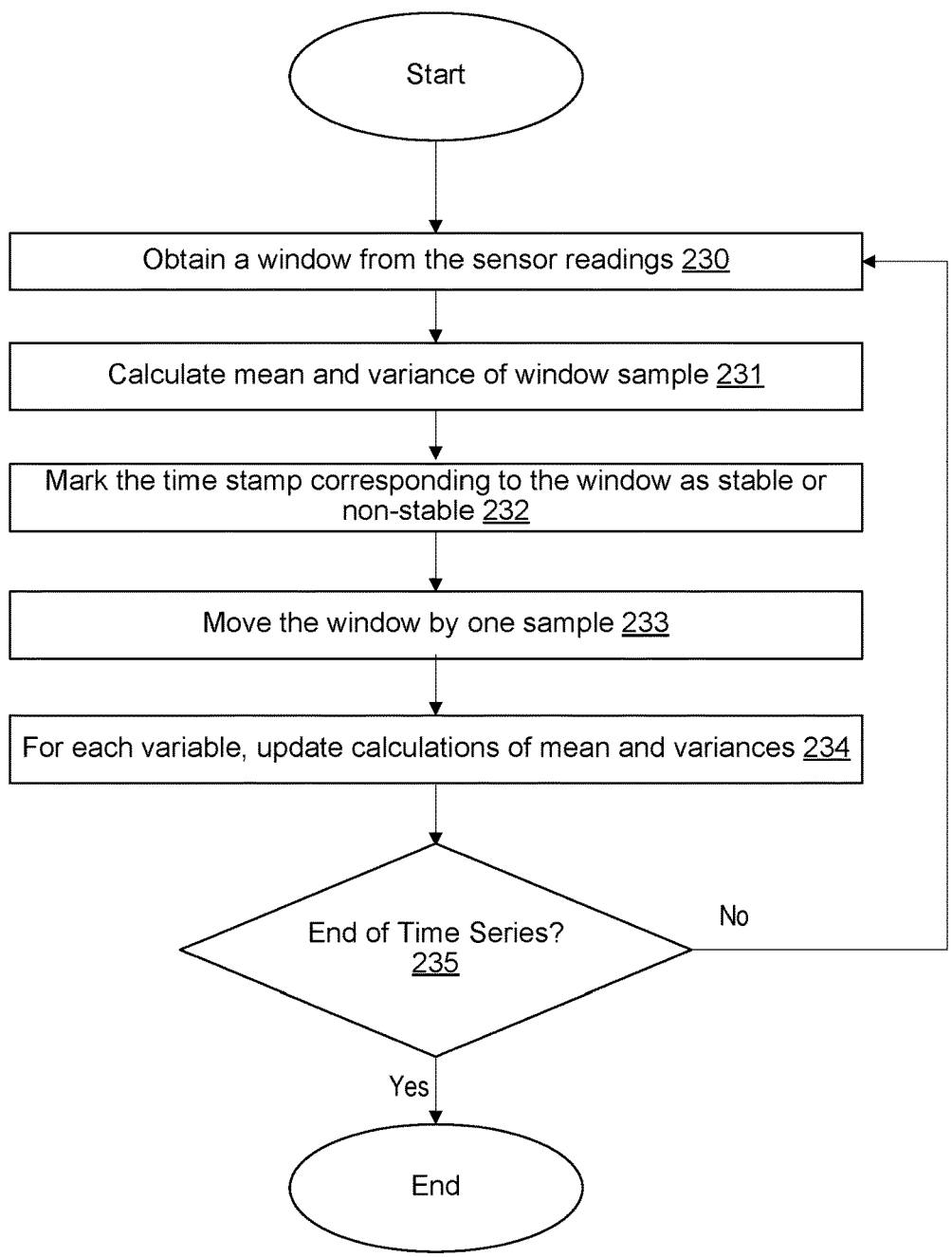
FIG. 2(d) illustrates a flow diagram for a stable mode detector submodule, in accordance with an example implementation.

FIG. 2(d) illustrates a flow diagram for a stable mode detector process 203, in accordance with an example implementation. When the equipment status changes from one mode to another (e.g., "off" to "operation" or vice versa), the raw signals from the sensors may experience high fluctuations shortly after the change. During these fluctuations, it may be difficult to obtain information about the relations between different signals. For instance, if the readings of sensor "A" reflect the changes in the readings of sensor "B", there may be a delay between the time at which sensor "A" and that at which "B" changes, and the data right after the transition of "B" should not be used to judge on the relation between the two signals. To avoid this problem, example implementations utilize a moving window to filter-out periods of the time series that experience large variances in the signals of interest. Given a set of sensor variables $v_1, \ldots, v_m$ and the corresponding thresholds on the variances of these variables $O'_1, \ldots O'_m$, the algorithm for stable mode detector submodule 203 executes the following flow diagram.

At 230, the stable mode detector process 203 starts at the entry corresponding to the first timestamp, and obtains the sensor readings in a window of size "w" samples. At 231, for each variable "$V_i$", the stable mode detector process 203 calculates the mean and variance of the samples for this variable $\{v_i^{(t)}, v_i^{(t-1)}, \ldots v_i^{(t-w)}\}$. At 232, the stable mode detector process 203 marks the timestamp at the end of the window as stable if $var(v_i^{(t)}, v_i^{(t-1)}, \ldots v_i^{(t-w)}) \leq O'_i$ for all variables. At 233, the stable mode detector process 203 moves the window by one sample (e.g. remove the first sample and add the "w+1"-th sample). At 234, for each variable "V", the stable mode detector process 203 updates the calculations of the mean and variances using recursive formulas. At 235, the stable mode detector process 203 checks if the end of the time series is reached. If so (Yes), then the flow ends. If not (No), then the flow proceeds back to 230.

The thresholds can be tuned using a few examples from stable and non-stable modes, or by other methods in accordance with the desired implementation.

Figure 4:
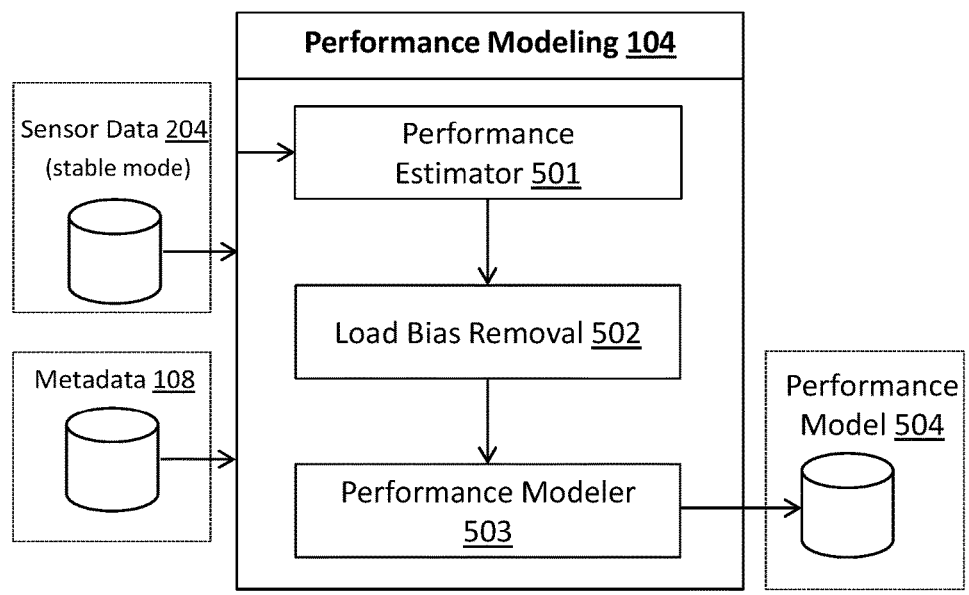
FIG. 4 illustrates an aspect of the performance modeling process, in accordance with an example implementation.

FIG. 4 illustrates a flow diagram of the performance modeling module, in accordance with an example implementation. The performance modeling module 104 builds a model for the performance of equipment from the sensor data 101. The performance modeling module 104 may involve the following processes. The performance estimator process 501 is configured to define Key Performance Indicators (KPIs) that reflects the performance of equipment from raw sensors data. The load bias removal process 502 is configured to removes the effect of load bias, which normalizes the KPI values based on the load on the equipment. The performance modeler process 503 is configured to define a performance model 504 based on the KPI values. This model can be used to represent performance change over time.

The performance estimator process 501 takes as input the sensor data during the stable mode and outputs a set of KPIs that quantify the overall performance of the equipment as well as its individual components. Information about the performance of the equipment can be obtained in the form of formulas in the metadata as well as high level description from the domain experts (e.g., the equipment should cool down faster when the fan is turned on at the maximum speed). In order to estimate the performance of the equipment, example implementations use the relations derived from the metadata and the domain knowledge and define a KPI for each component as well as the overall performance of the equipment. At time t, each KPI is defined as:

$$KPI(t)=f(V_1(t), \ldots V_m(t)),$$

Where $f$ is a function of the values of sensor variables $V_1, \ldots V_m$ at time t. Without loss of generality, it can be assumed that higher values for KPI reflect better performance. The KPI value at time t is calculated for a set of values for the corresponding time series of $V_1, \ldots V_m$. This results in a new time series for each KPI. The KPI time series are calculated for historical and new data and stored in a storage medium for further analysis.

Figure 5A:
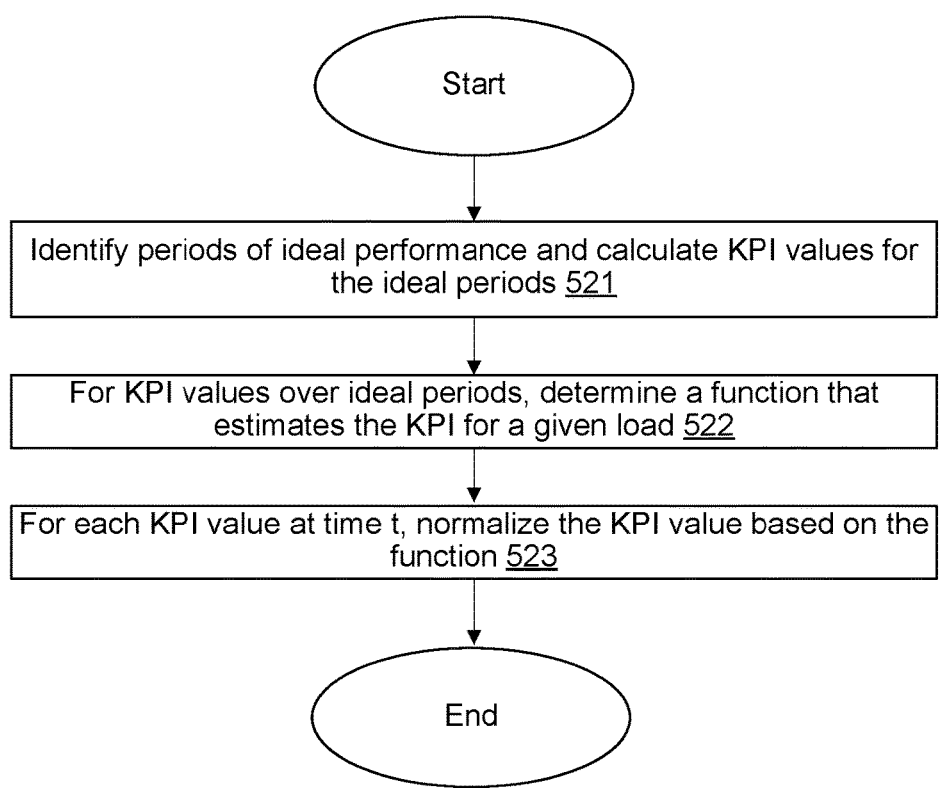
FIGS. 5(a) and 5(b) illustrate aspects of the load bias removal, in accordance with an example implementation.

FIG. 5(a) illustrates a flow diagram of the load bias removal process, in accordance with an example implementation. The load bias removal process 502 is configured to remove load bias from the performance estimation. This load bias removal process 502 is applied because there can be a tendency of performance to be dependent on the load of the equipment. When the load on the equipment is low, the KPI values tend to be higher than the KPI values corresponding to higher load. This reflects the fact that equipment performs relatively better under low load. To remove the load bias, the following flows are executed. At 521, the load bias removal process 502 identifies periods of ideal performance from historical sensor data and calculates KPI values for the ideal periods. These periods can correspond to the first few months of operation of the equipment. The metadata 108 can be used to obtain this information and to avoid including periods in which there were installation or operation problems. At 522, the load bias removal process 502 is configured to, for the KPI values over ideal periods, learn a function h(l) that estimates the KPI for load l. This function can be learned using linear or non-linear regression techniques depending on how the KPI changes with respect to the load and depending on the desired implementation. At 523, the load bias removal process 502 is configured to, for each new KPI value at time t, normalize the KPI value with the value of h(l) for the corresponding load value l at time t:

$$\widetilde{KPI}(t)=N(KPI(t),h(l(t))$$

where N(a, b) is a function that normalizes a using b. Possible instances of N are division N(a, b)=a/b and subtraction N(a, b)=a−b When load bias removal is applied to the ideal periods, this will result in a normalizing the KPI values during the idea periods to be distributed around N(a, a) (e.g., 1 for division and 0 for subtraction).

Figure 5B:
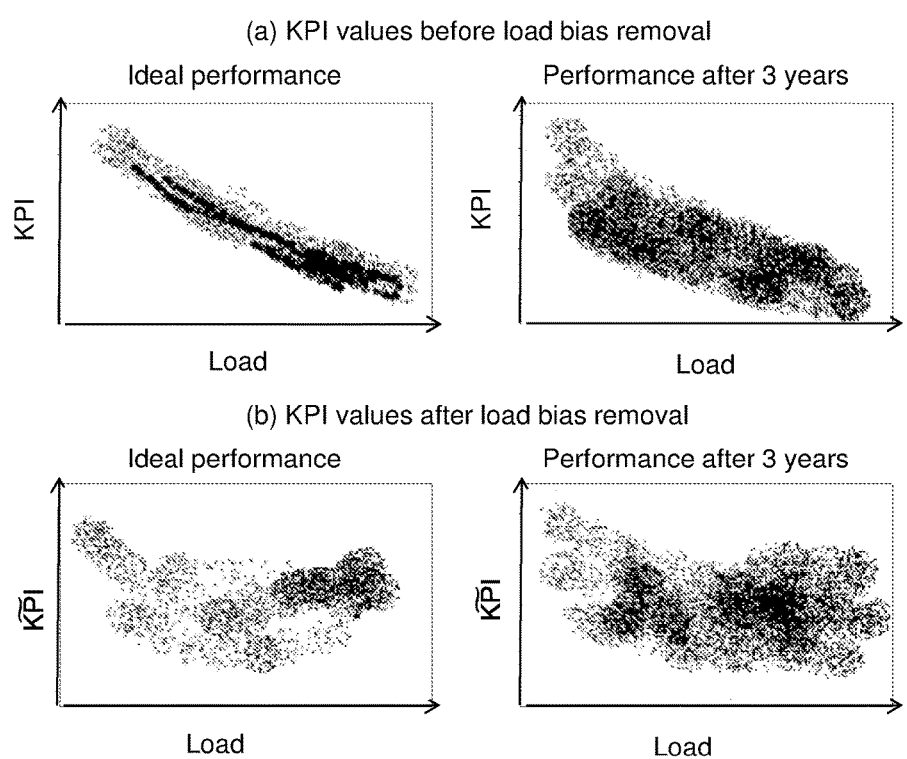

The definition of load can differ from one type of equipment to another. For example, the load value can directly correspond to one of the sensor values or it can be a function over multiple sensors. The metadata of the equipment is used to get a definition of the load from the sensor data. After the load value is obtained for each timestamp, the aforementioned flow of FIG. 5(a) can be applied. FIG. 5(b) illustrates the load bias removal process for a sample KPI using N(a, b)=a/b.

The performance modeler process 503 is configured to define a performance model 504 based on the KPI values. This model can be used to represent performance change over time. The performance modeler process 503 is configured to treat each KPI as a random variable and models the performance of the equipment or its components as the probability density function of the KPI:

$$p(v,T)=p(V_T=V)$$

where T is a given period of time, $V_T$ is a random variable that represents the KPI during period T, and p(v, T) is the probability that $V_T$ is equal to v.

The use of density functions to model performance reflects the fact that the performance of the equipment is not monotonically decreasing from the day of installation until the equipment breaks down. In reality, new equipment may experience short bursts of bad (e.g. below expectation of the operator) performance during normal operation (e.g. due to harsh operation conditions), but such bad performance will not be dominant for new equipment. On the other hand, older equipment may still perform well (e.g. above expectation of the operator) under mild operation conditions. However, such good performance will not be that dominant when the equipment is older. Thus, the probability of having a high KPI will be high during the first years of installation, and the probability will decrease over time as the performance of the equipment degrades.

The probability density function p(v, T) can be learned from the historical KPI values during period T using density estimation techniques. Such density estimation techniques include parametric methods which assume some distribution (e.g., Gaussian) for the KPI values and learn the parameters of this distribution from the data, and non-parametric methods which make no assumption about the distribution of the KPI values such as kernel density estimation.

Figure 6A:
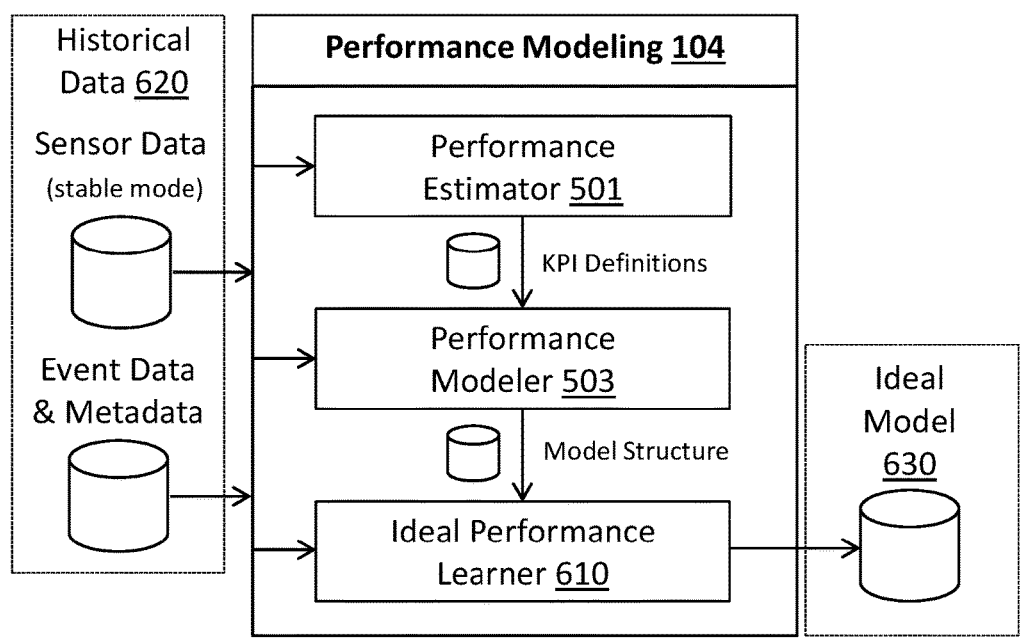
FIGS. 6(a) to 6(c) illustrates aspects of the performance modeling process for performance monitoring, in accordance with an example implementation.

FIG. 6(a) illustrates another flow diagram of the performance modeling module for performance monitoring, in accordance with an example implementation. Specifically, FIG. 6(a) illustrates a flow diagram for determining the ideal performance model 630 for associated equipment and KPI based on historical data 620. The performance modeling module 104 builds a model for the performance of equipment from the historical sensor data. The performance modeling module 104 may involve the following processes. The performance estimator process 501 is configured to define Key Performance Indicators (KPI) that reflects the performance of equipment from raw sensors data as described from FIG. 4. The performance modeler process 503 is configured to define a performance model based on the KPI values as described in FIG. 4. The performance model can be used to represent performance change over time. The ideal performance learner process 503 is configured to learn from the data the parameters of the model during the ideal performance periods based on historical data 620.

In examples implementations, when the KPI goes below a certain value, performance degradation is detected and reported to the maintenance staff. In order to quantify the degradation, example implementations utilize the cumulative density function which represents the probability that the KPI is below a certain value. The cumulative density function is defined as:

$$F(v, T)=P(V_T \leq v)$$

where T is a given period of time, $V_T$ is a random variable that represents the KPI during period T, and F(v, T) is the probability that $V_T$ is less than or equal to v. For a target performance level $v_i$, the higher the value of $F(v_i, T)$ the more severe is the performance degradation. The example implementations determine multiple levels $\{v_1, \ldots, v_I\}$ for which the performance is monitored. For a monitoring level $v_i$, the performance degradation over time is defined as:

$$F(v_i,T)=P(V_T \leq v_i)$$

Figure 6B:
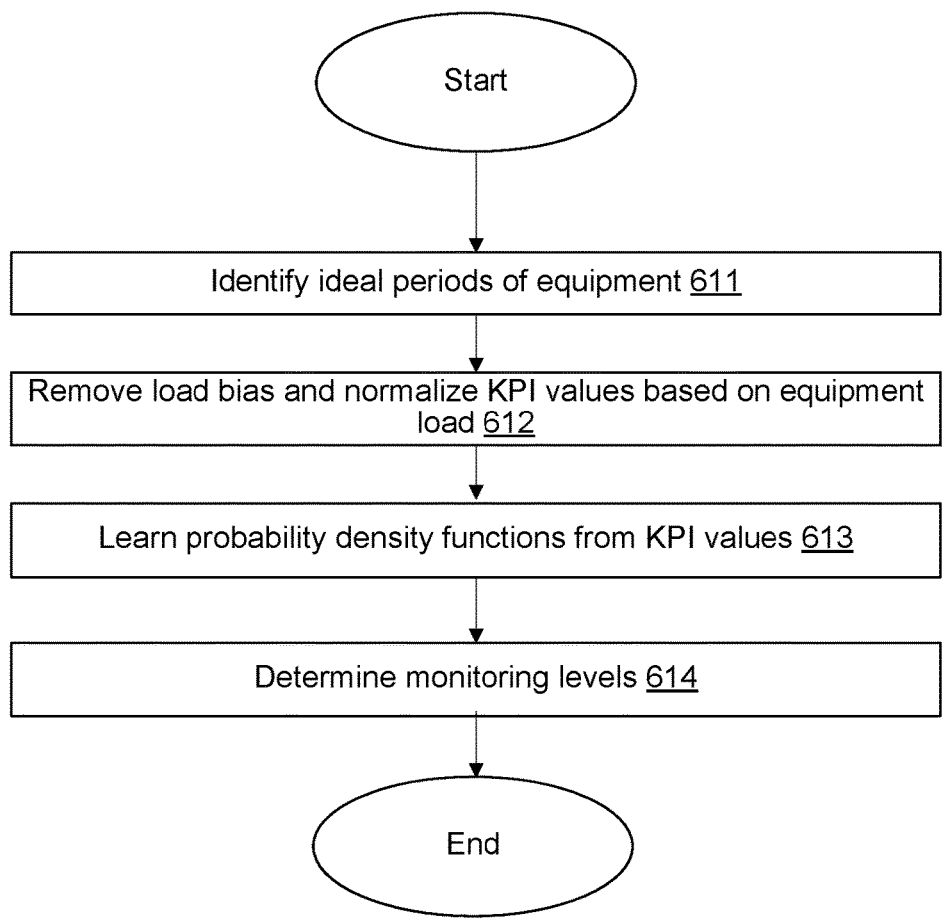

FIG. 6(b) illustrates a flow diagram for the ideal performance learner process 610, in accordance with an example implementation. In this phase, an ideal performance model is learned from historical data. Given historical sensor data and the corresponding KPI values, this learning phase can be derived from the following flows. At 611, the ideal performance learner process 610, is configured to identify ideal periods to determine the periods of time during which the equipment was performing ideally. These periods can correspond to the first few months of operation of the equipment. The event data and metadata are used to obtain this information and to avoid including periods in which there were installation or operation problems. At 612, the ideal performance learner process 610 is configured to remove load bias, to normalize the KPI values based on the load on the equipment as described in FIGS. 5(a) and 5(b).

At 613, the ideal performance learner process 610 is configured to learn density functions, to learn the probability density functions from the KPI values that correspond to ideal periods $p(v, T_{ideal})=P(V_{Tideal}=v)$. Parametric or non-parametric methods can be used for this purpose. At 614, the ideal performance learner process 610 is configured to learn monitoring levels: which determines the KPI values $\{v_1, \ldots, v_I\}$ below which the performance degradation will be monitored during the online monitoring phase. For example, by specifying a monitoring level of 0.8, the system will monitor and report for each new period of measurements the probability of having KPI values below 0.8. As there are typically different categories of maintenance actions, the maintenance staff will require the monitoring of multiple performance levels for each KPI, with each level corresponding to one category of maintenance actions. For example, when the KPI values significantly go below 0.8 (but still mostly above 0.5), the maintenance staff will perform a minor maintenance action but when the KPI values significantly go below 0.5, they will performance a major maintenance action. Depending on the number of maintenance categories, multiple performance levels can be monitored. These monitoring levels can be directly specified by the maintenance staff in terms of KPI values $\{v_1, \ldots, v_I\}$ (e.g., monitor KPI values below 0.9, 0.8, and 0.5), or learned from the ideal data by specifying the values of cumulative probabilities in the ideal performance model $\{c_1, \ldots, c_I\}$ (e.g., monitor KPI values whose ideal cumulative probabilities are below 10%, 1% and 0.1%). Given these probabilities, the corresponding KPI values can be obtained from the performance model as:

$$v_i=\max(v) \text{ subject to } F(v,T_{ideal}) \leq c_i$$

Figure 6C:
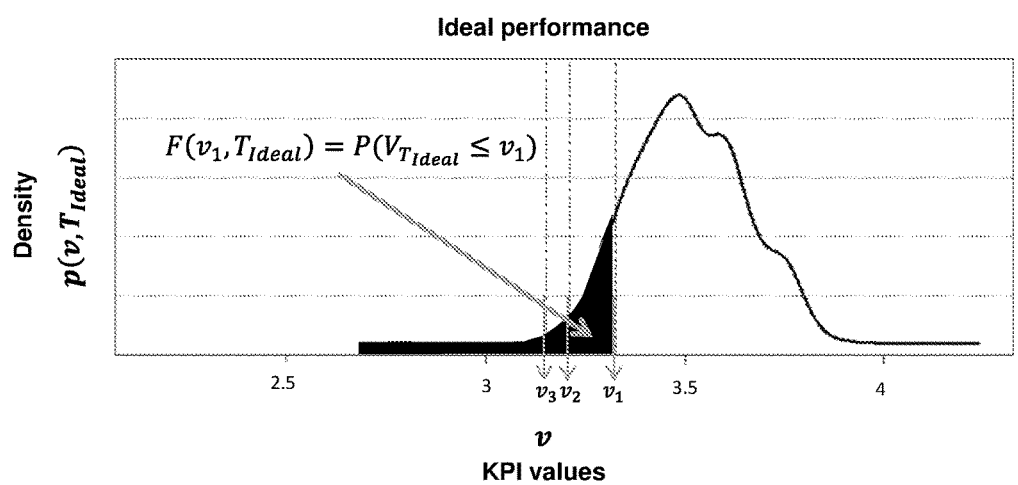

FIG. 6(c) illustrates a sample model for the ideal performance and the monitoring levels corresponding to $c_1=10\%$, $c_2=1\%$ and $c_3=0.1\%$ (Cumulative probabilities during ideal periods: $c_i=F(v, T_{ideal})$), and corresponding KPI monitoring level $v_1$-$v_3$.

Thus from the example implementations described above, the system can monitor performance at desired levels (e.g., performing at 10% of ideal performance, 15% of ideal performance, etc.), and then generate an alert based on the desired threshold (e.g., alert when performance is <10% of ideal performance).

Figure 7A:
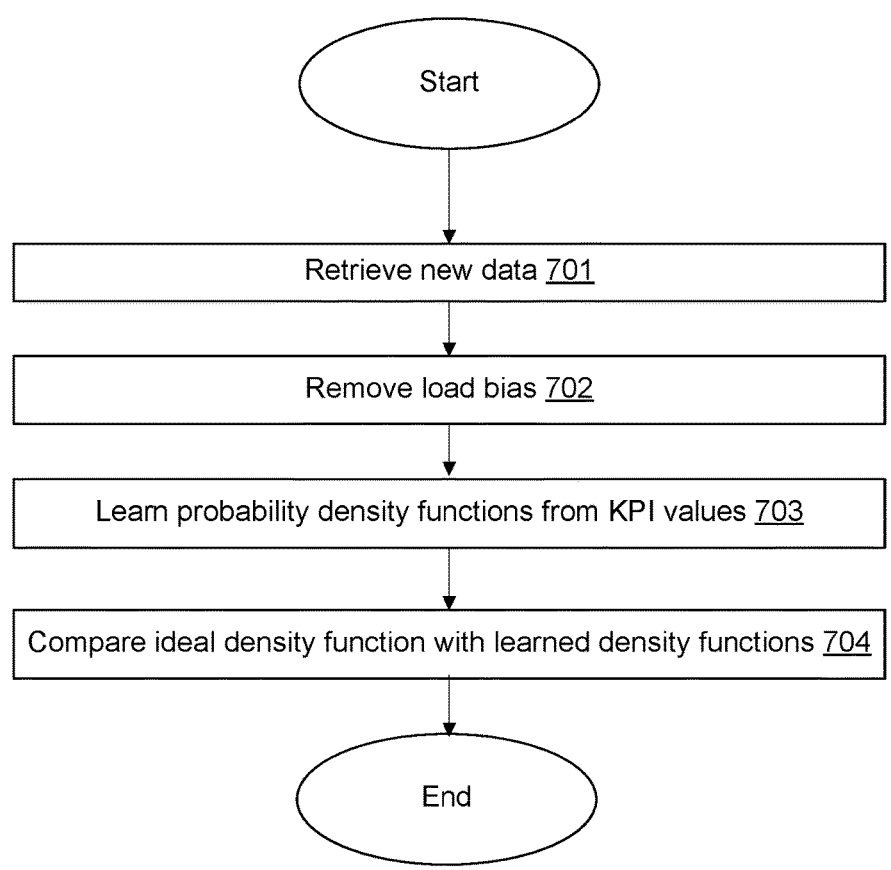
FIGS. 7(a) and 7(b) illustrate aspects of performance monitoring for an equipment, in accordance with an example implementation.

FIG. 7(a) illustrates a flow diagram for the performance monitoring module 115, in accordance with an example implementation. In example implementations, performance monitoring can be conducted on the equipment by a managing apparatus configured to provide a control system for maintenance actions on the equipment. When the performance falls below a threshold, then the performance monitoring can involve alerting the maintenance staff to conduct a maintenance action. The maintenance action can then be examined to determine if the maintenance action was effective or if it did cause performance degradation. The performance monitoring involves the monitoring and detection of performance degradation for new sensor data. Given the new sensor data and the corresponding KPIs, the monitoring phase proceeds as follows.

At 701, the performance monitoring process retrieves new data which can involve collecting new sensor data and KPIs. The data is collected in batches (e.g., every week). The frequency of data collection can be adjusted according to the nature of the equipment. At 702, the performance monitoring removes load bias to normalizes the new KPIs based on the load on the equipment. The implementations for removing load bias in this process can be implemented as according to FIGS. 5(a) and 5(b).

At 703, the performance monitoring process learns the density functions, which can involve learning probability density functions from the KPI values that correspond to new periods. In example implementations, the performance monitoring process learns two density functions for each batch of new data. Specifically, the performance monitoring process learns the density function for new KPI values during the current batch. For instance, a density function is learned based on the KPI values during the last month of data. Monitoring this density function allows for detecting sudden degradation that happens recently in the equipment performance. This sudden degradation could be due to a malfunction in the equipment of the operation or an extreme environment condition. Ideally, these types of sudden degradations should be detected by anomaly detection modules which depend on the monitoring sensor data in real time. However, the anomaly detection technique may miss these degradations if the change in the sensor values spans a wider time window. In this case, monitoring density functions during the recent batch has a higher chance of detecting these changes.

The performance monitoring process also learns the density function for cumulative KPI values collected since the installation of equipment. For instance, the density function at the fifth year will be learned based on the KPI values during the last five years including the ideal periods as well as the most recent batch of KPIs. When a new batch of the data arrives at the start of the sixth year, the new density function will be learned based on all the previous KPIs as well as the new KPIs. Monitoring this density function allows for capturing slow degradation of performance as the most recent batch might include an insignificant degradation in KPI but looking at a wider span of data will reveal that this degradation has been happening for some time, and there is an accumulating evidence to issue a warning to the user.

At 704, the performance monitoring process compares with monitoring levels, which compares the ideal density function with the density functions learned from new data, and identifies if there is an increase in the probability $p(v, T_{New})$ for low values of the KPI. The flow at 704 creates a dashboard for the system users which displays the new cumulative density function $F(v_i, T_{New})=P(V_{TNew} \leq v_i)$ for each monitoring level v, determined during the learning phase. It also displays a warning if this cumulative probability goes above a warning threshold $w_i$:

If $F(v_i, T_{New}) \geq w_i$, Alarm(Severity=$Fn(F(v_i, T_{New}), c_i)$)

The severity of the warning can be determined using the new cumulative probability $F(v_i, T_{New})$ for this monitoring level $v_i$ and the corresponding cumulative probability during the ideal performance $c_i$. The system user can assign a single or multiple warning thresholds for each monitoring level $\{w_1, \ldots, w_l\}$ and associate each warning threshold with maintenance actions that should be performed when the cumulative probability exceeds this threshold.

Figure 7B:
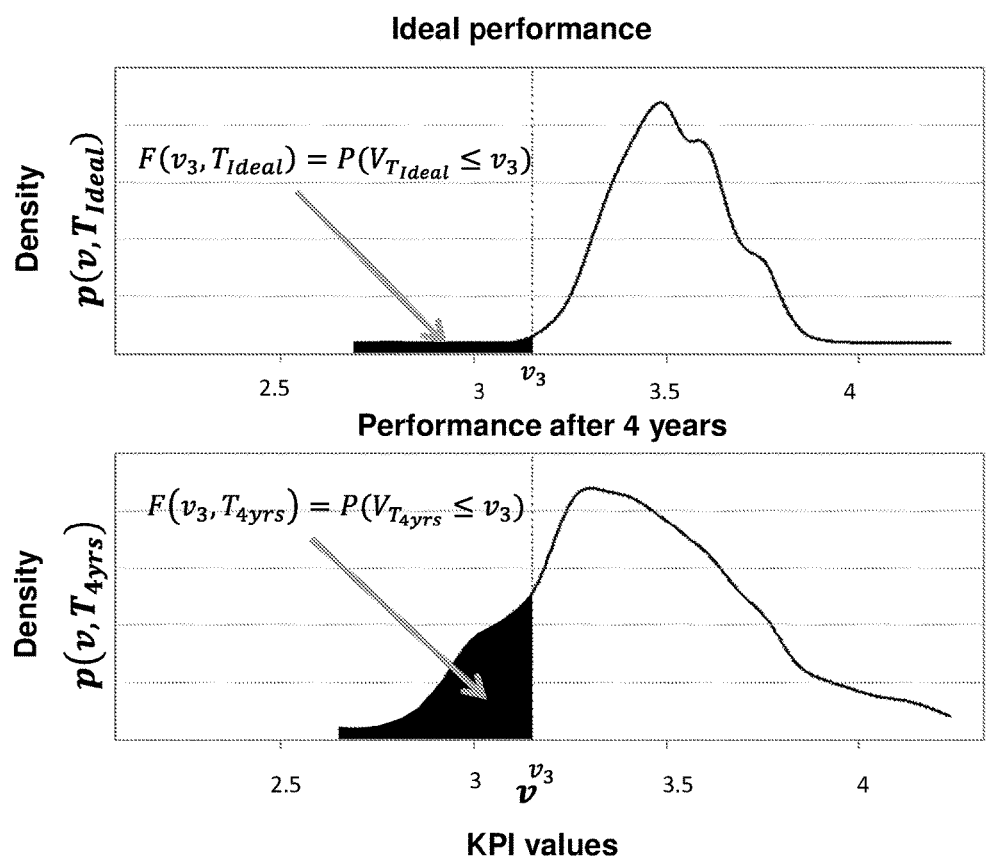

FIG. 7(b) illustrates examples of density functions for ideal and degraded performance, and the values of the cumulative density functions for one monitoring level. The monitoring levels corresponds to level 1: $c_1=10\%$, level 2: $c_2=1\%$ and level 3: $c_3=0.1\%$ (Cumulative probabilities during ideal periods: $c_i=F(v, T_{ideal})$). For each level, the system will issue a warning if the value of the cumulative density function exceeds a threshold corresponding to that level. The maintenance staff will accordingly perform the maintenance actions to address the issued alarms.

One part of the flow in the two phases of performance analytics is the removal of the load bias 702. The removal of load bias can be needed as there may be a tendency of performance to be dependent on the load of the equipment. When the load on the equipment is low, the KPI values tend to be higher than the KPI values corresponding to higher load. This reflects the fact that equipment performs relatively better under low load. In order to remove this bias, the example implementations implement the removal of load bias 702 as described in FIGS. 5(a) and 5(b).

Figure 8:
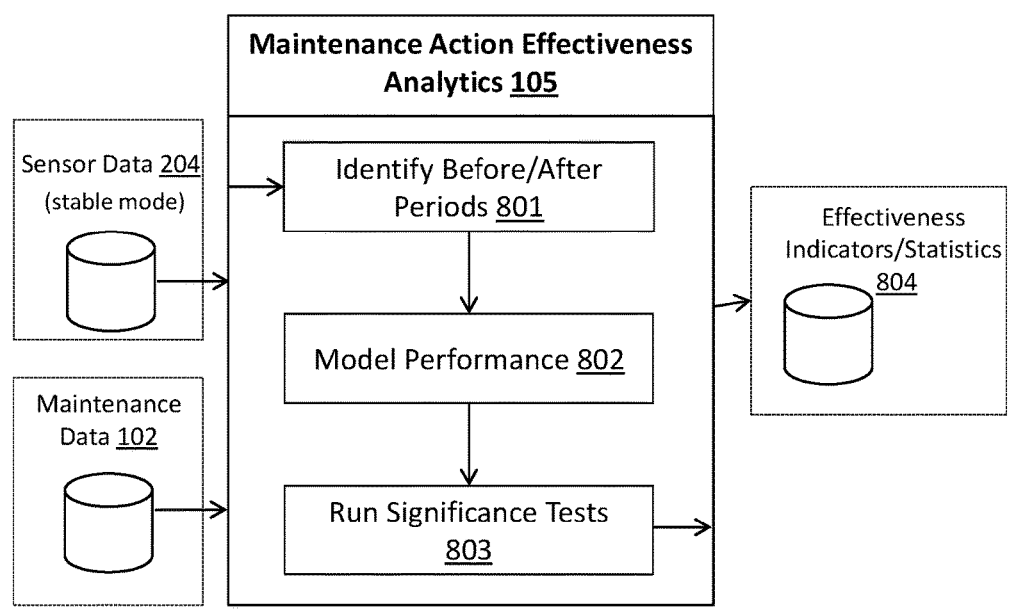
FIG. 8 illustrates an example flow for maintenance action effectiveness analytics, in accordance with an example implementation.

FIG. 8 illustrates an example flow for maintenance action effectiveness analytics, in accordance with an example implementation. The module for the maintenance action effectiveness analytics 105 is configured to estimate the effectiveness a particular maintenance action in improving the performance of the equipment or one of its components. The module for the maintenance action effectiveness analytics 105 receives as input information about the maintenance action to be assessed along with the sensor data and KPIs before and after maintenance. The flow for the maintenance action effectiveness analytics 105 proceeds as follows.

At 801, the maintenance action effectiveness analytics 105 is configured to identify before/after periods by collecting sensor data 101 before and after the maintenance action. The duration of the before and after periods varies depending on how long the effect of the maintenance is expected to last, and can be set by a domain expert or through other methods depending on the desired implementation (e.g., preset to 1-2 months). Depending on the desired implementation, the flow at 801 can also use metadata 108 about events that happened in the equipment environment to remove measurements within the before/after periods that correspond to abnormal operating conditions that might affect the performance (e.g., severe weather conditions.)

At 802, the maintenance action effectiveness analytics 105 is configured to model performance by calculating KPIs, normalizing the new KPIs based on the load on the equipment, and learning the performance model for before and after performance, as described in FIG. 5.

At 803, the maintenance action effectiveness analytics 105 is configured to run significance tests by comparing the performance models for before and after periods to determine if there is a statistical enhancement or degradation due to maintenance. Depending on the desired implementation, various significance tests can be applied in this flow. Such significance tests include parametric tests which makes an assumption about the distribution of the data (e.g., t-test) and non-parametric test which make no such assumptions (e.g., Kolmogorov-Smirnov test). The choice of the significance test depends on the type of the equipment and the corresponding KPIs. Multiple tests can be conducted for each maintenance action to discover whether there was an increase, decrease or no-change in performance due to maintenance. An example for using Kolmogorov-Smirnov test for estimating the effect of maintenance actions on the performance of cooling equipment is provided in FIG. 9, however any significance test may be deployed according to the desired implementation.

Figure 9:
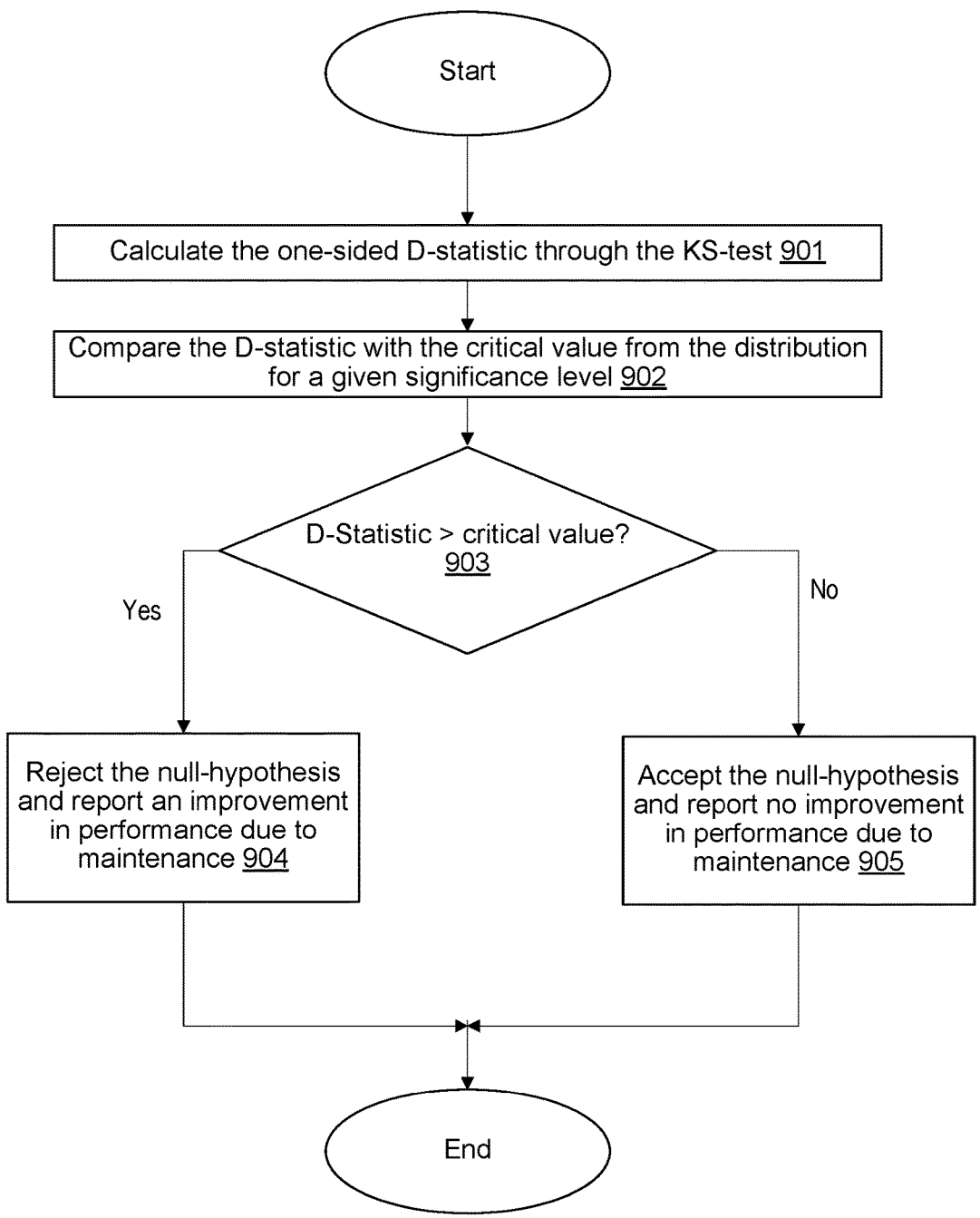
FIG. 9 illustrates an example flow for maintenance effectiveness assessment through a Kolmogorov-Smirnov test, in accordance with an example implementation.

FIG. 9 illustrates an example flow for maintenance effectiveness assessment through a Kolmogorov-Smirnov test, in accordance with an example implementation. One example implementation for the statistical significance testing flow of the algorithms is the Kolmogorov-Smirnov test (KS-test). Possible advantages of the KS-test include requiring no assumption about the distribution of the data, and in contrast to the t-test, the KS-test can capture the difference between two normal distributions having similar averages but different variations. The Kolmogorov-Smirnov test depends on comparing the cumulative distributions of before and after samples and detecting if there is a statistically significant difference between them. Let $KPI_b$ and $KPI_a$ be two random variables that reflect the performance before and after the maintenance action, respectively. The true cumulative density functions (CDF) for $KPI_b$ and $KPI_a$ is defined as:

$$F_b(V)=p(KPI_b \leq v), f_a(v)=p(KPI_a \leq v)$$

For a given v, the higher the cumulative density, the worse the performance becomes due to the increase in probability of having a low KPI value. Thus, if there is a significant improvement in performance after maintenance, then $F_b(v) > F_a(v)$ for some values v. On the other hand, if there is no improvement in performance at all due to maintenance, then $F_b(v) < F_a(v)$ for all values v. To test for significant improvement in performance, one example implementation utilizes a one-sided Kolmogorov-Smirnov test that looks for a statistical increase in $F_b(v)$ compared to $F_a(v)$. The null-hypothesis is that distribution $F_b(v)$ is not greater than $F_a(v)$, and the alternative hypothesis is that $F_b(v)$ is greater than $F_a(v)$. The flow for FIG. 9 is as follows.

At 901, the maintenance action effectiveness analytics 105 is configured to calculate the one-sided D-statistic through the KS-test. The one-sided D-statistic is calculated as $$D = \sup_v (F_b(v) - F_a(v))$$

where $\sup_v$ is the supremum of the set of differences.

At 902, the maintenance action effectiveness analytics 105 is configured to compare the D-statistic with the critical value c(σ) from the Kolmogorov distribution for a given significance level σ (the probability of rejecting the null-hypothesis when it is actually true). The comparison is calculated as $$\text{Compare}\left(D, \sqrt{\frac{n_a+n_b}{n_a n_b}} \ c(\sigma)\right)$$

At 903, the maintenance action effective analytics 105 is configured to determine if the D-statistic is greater than the critical value based on the comparison of 902. That is, a check is made to determine if $$\left(D > \sqrt{\frac{n_a+n_b}{n_a n_b}} \ c(\sigma)\right)$$

If so (yes), then the flow proceeds to 904 to reject the null-hypothesis, and report that there is a significant improvement in performance due to maintenance. The threshold for determining a level of improvement to be considered significant can be set by the domain expert, or through other methods depending on the desired implementation. Otherwise (No), the flow proceeds to 905 to accept the null-hypothesis and report that there is no significant improvement in performance due to maintenance.

Figure 10A:
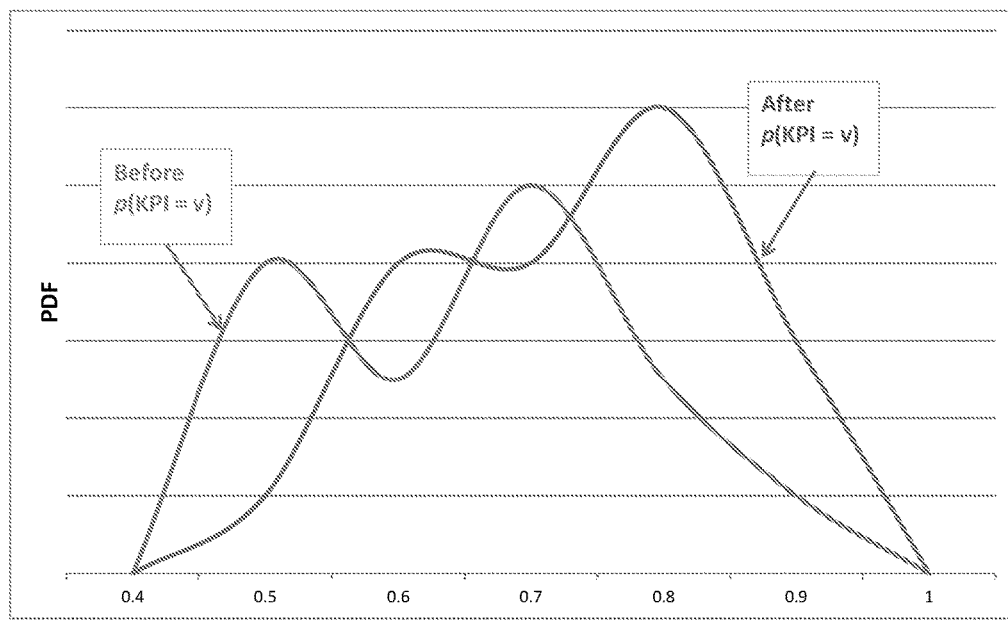
FIGS. 10(a) and 10(b) illustrate an example of the cumulative density functions before and after maintenance and how the D-statistic is calculated, in accordance with an example implementation.
Figure 10B:
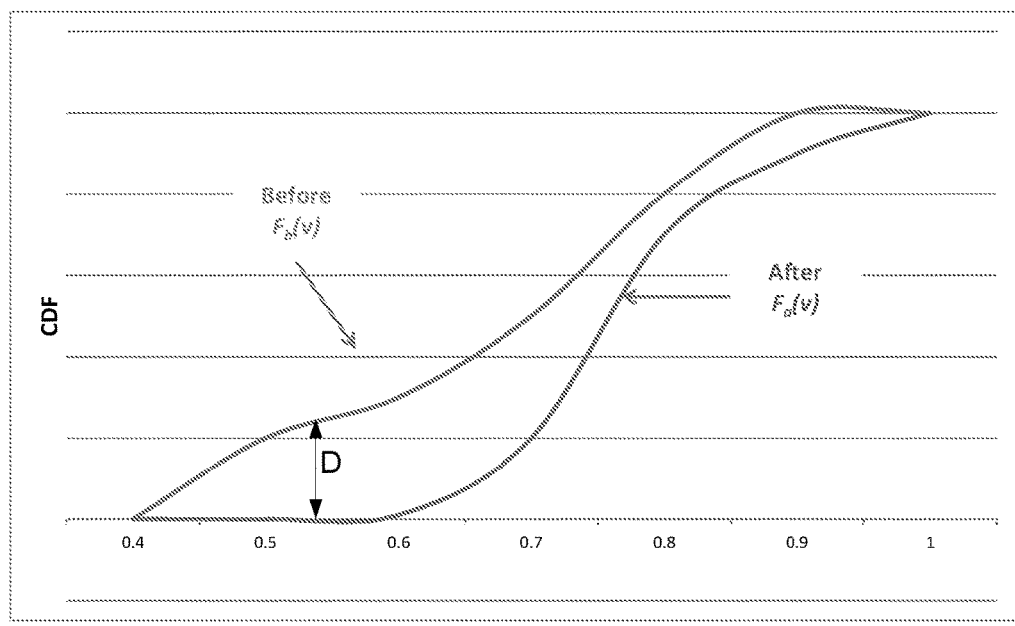

FIGS. 10(a) and 10(b) illustrate an example of the probability and cumulative density functions, respectively, before and after maintenance and how the D-statistic is calculated, in accordance with an example implementation. Specifically, FIG. 10(a) illustrates the probability density function before and after the KS-test, and FIG. 10(b) illustrates the cumulative density function before and after the KS-test with the D-statistic. For the KS-test, the test only indicates that significant performance improvement due to maintenance has occurred if the null-hypothesis is rejected. On the other hand, if the null-hypothesis is true, the result does not indicate whether there is performance degradation due to maintenance (e.g., maintenance-induced faults) or if there is no change in performance. To differentiate between the two cases, another one-sided Kolmogorov-Smirnov test can be conducted to look for statistical decrease in $F_b(v)$ compared to $F_a(v)$. The null-hypothesis is that distribution $F_b(v)$ is not smaller than $F_a(v)$, and the alternative hypothesis is that $F_b(v)$ is smaller than $F_a(v)$. The two Kolmogorov-Smirnov tests are referred to KS-E and KS-D, respectively. The results of the two tests are combined as shown in Table 3 below.

TABLE 3

Combining the two Kolmogorov-Smirnov tests

| KS-E | KS-D | Decision |
|---|---|---|
| No enhancement | No degradation | Report no change in performance |
| No enhancement | Degradation | Report performance degradation |
| Enhancement | No degradation | Report performance enhancement |
| Enhancement | Degradation | Report mixed enhancement and degradation (no stochastic ordering between $F_b(v)$ and $F_a(v)$) |

The following parameters can be utilized by the example implementations to implement the flow of FIG. 9. One example parameter is the length of monitoring periods before and after maintenance, which can be defined by the domain experts for each type of maintenance actions, or learned from historical data using maintenance actions with previously known effectiveness (i.e., successful or unsuccessful). Another example parameter is the KS-test confidence level which can be defined by the domain expert (e.g. 5% confidence level) depending on how confident the maintenance is expected to improve performance. The cumulative density functions and the D-statistic can be estimated from the actual KPI values during the monitoring periods before and after the maintenance action.

Figure 11:
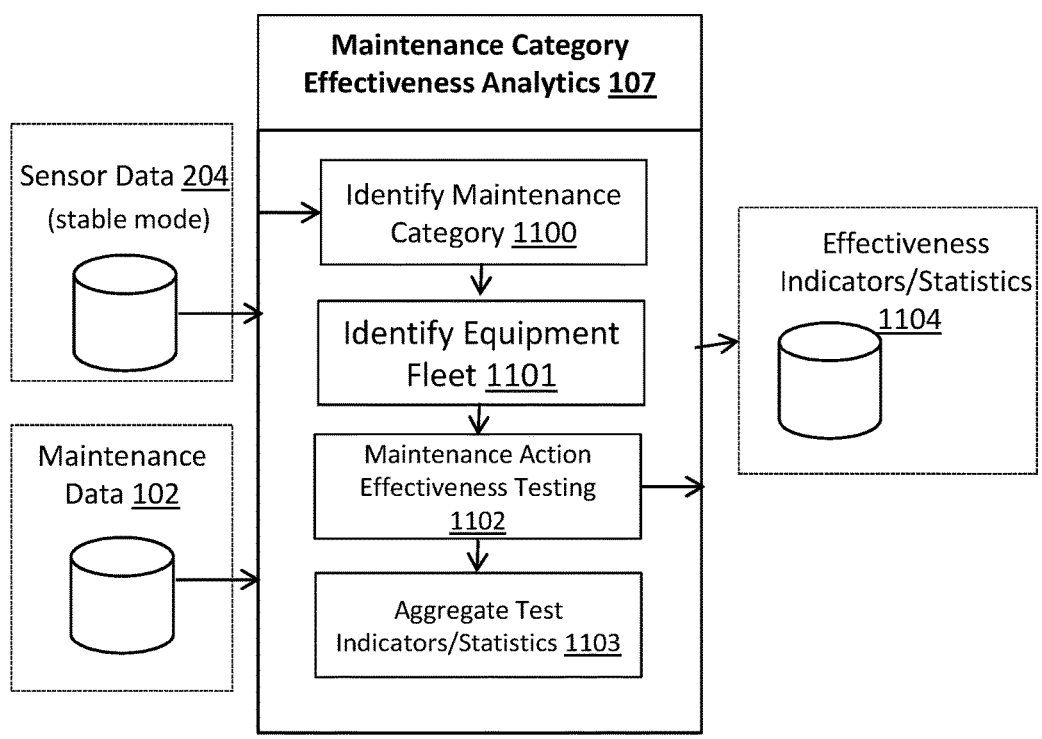
FIG. 11 illustrates an example flow for the maintenance category effectiveness analytics, in accordance with an example implementation.

FIG. 11 illustrates an example flow for the maintenance category effectiveness analytics 107, in accordance with an example implementation. The module for the maintenance category effectiveness analytics 107 is configured to estimate the effectiveness of a group of maintenance actions in improving the performance of a fleet of equipment. The module receives as input the effectiveness scores, p-values and statistics 804 from the maintenance action effectiveness module of FIG. 8 and applies a variety of statistics to give insights about the effectiveness of the group of actions. The analytics process proceeds as follows.

At 1100, the maintenance category effectiveness analytics 107 is configured to identify a category of maintenance actions, which allows the system user to specify a criterion for selecting a group of maintenance actions for which the maintenance analysis will be conducted. Maintenance grouping can be done based on different factors including but not limited to type, vendor, and time, depending on the desired implementation. The category can be defined by the operator to track, for example, vendors performing maintenance actions to determine which vendor provides the best maintenance.

At 1101, the maintenance category effectiveness analytics 107 is configured to identify a fleet of equipment, which allows the system user to specify a criterion for selecting a fleet of equipment for which the analysis will be maintenance conducted. Equipment can be grouped based on different factors including but not limited to location, manufacturer, and age, depending on the desired implementation. Equipment fleets can be defined based on location, type of equipment, or any other desired implementation.

At 1102, the maintenance category effectiveness analytics 107 is configured to conduct maintenance action effectiveness testing by applying statistical significance test for each action. The statistical significance is applied by calculating Key Performance Indicators (KPIs), normalizing the new KPIs based on the load on the equipment, and learning the performance model for before and after performance through the use of the same methods as the performance modeling 104. The statistical significance test can be any test according to the desired implementation, such as KS-tests.

At 1103, the maintenance category effectiveness analytics 107 is configured to aggregate indicators or statistics of significance tests. The aggregation functions can include, but are not limited to calculation of the percentage of actions within the group that resulted in better, worse, same performance due to the maintenance. Additional aggregation functions can include studying the significance of the distribution of the statistics of all the significance tests for individual actions (e.g., the distribution of the D-statistics for individual KS-tests), and the comparison of two or more distributions of test statistics that correspond to multiple categories of maintenance actions to know which maintenance category is achieving highest improvement in performance.

FIGS. 12(a) to 12(c) and FIGS. 13(a) to 13(b) illustrate example management information that example implementations may utilize to facilitate the functionality of the present disclosure. The management information of FIGS. 12(a) to 12(c) and FIGS. 13(a) to 13(b) can be generated based on the example implementations described above and utilize to facilitate the output of the performance of a maintenance action. Specifically, FIG. 12(a) illustrates an example grouping of equipment in accordance to a desired implementation. The grouping may be set by a domain expert, or according to the desired implementation of the operator. For example, the operator may desire to group equipment together based on location of operation, for being the same type of equipment, equipment employed over certain time periods, and so on, depending on the desired implementation. In such implementations, the operator may then view the effect of maintenance actions over a desired group of equipment. FIG. 12(b) illustrates an example of parameters that can be associated with equipment. The parameters can include the type of equipment, the manufacturer, date that the equipment was employed, and so on depending on the desired implementation. FIG. 12(c) illustrates an example maintenance action log for equipment. Each maintenance action can be organized by a maintenance ID, and can be associated with the corresponding equipment upon which the maintenance was implemented. The parameters associated with the maintenance action can include the type of maintenance, the date of the maintenance, the name of the operator of the maintenance, and so on, depending on the desired implementation. FIG. 13(a) illustrates example sensor readings for equipment for measuring desired attributes for formation of the KPI values. Each equipment may be associated with sensors to track a value for a desired attribute, wherein the values can also be timestamped. FIG. 13(b) illustrates example KPI functions used for determining the performance of a maintenance action. The KPIs can be calculated through a corresponding KPI function, which can utilize one or more of the values from attributes associated with the equipment, or one or more other KPI values depending on the desired implementation. For example, a KPI function for tracking the fuel efficiency for a vehicle may have a function based on miles driven from the odometer of the vehicle versus fuel consumed by the vehicle, or can be directly measured by the miles per gallon sensor readings of the vehicle.

Figure 14:
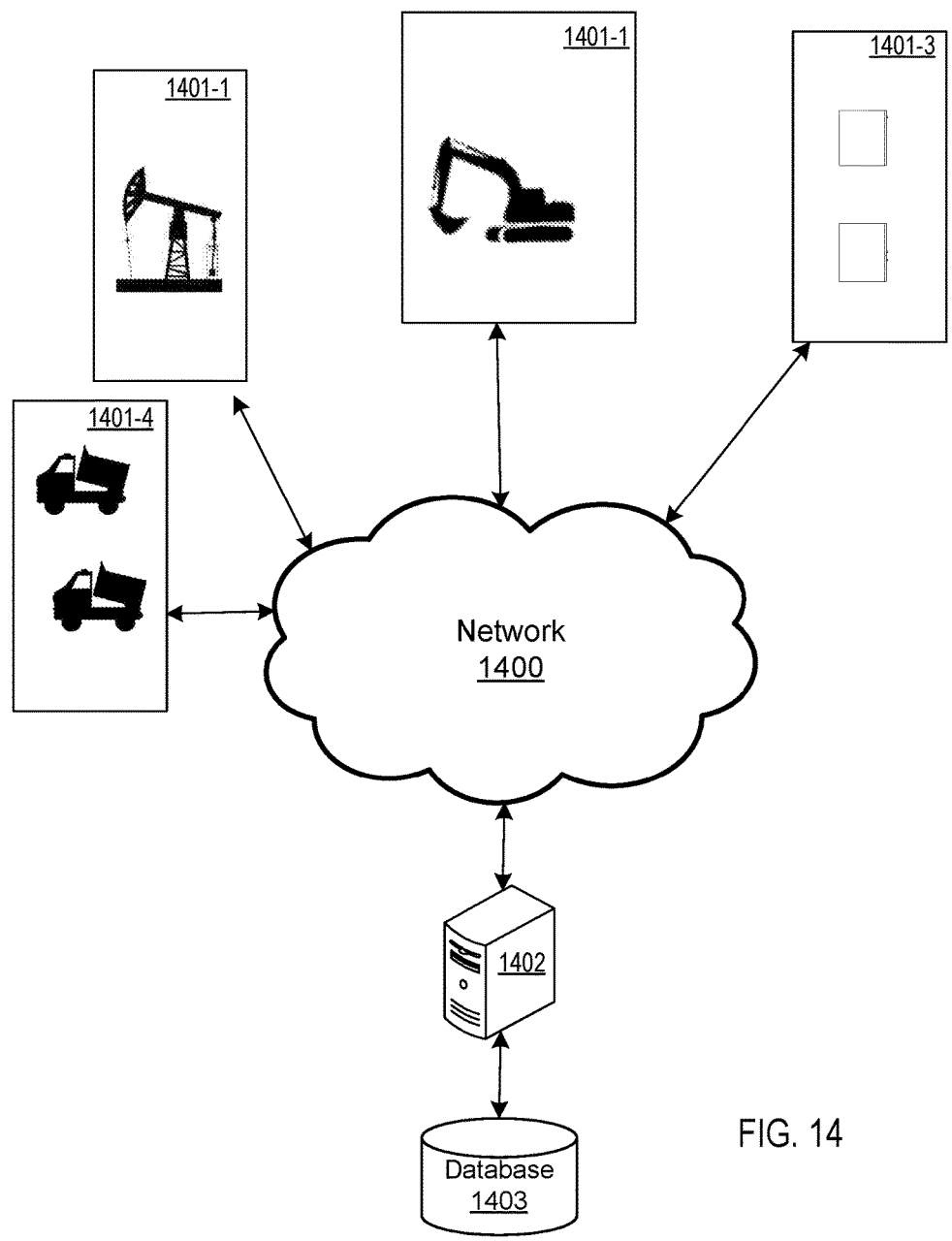
FIG. 14 illustrates a system involving a plurality of equipment and a management apparatus, in accordance with an example implementation.

FIG. 14 illustrates a system involving a plurality of equipment and a management apparatus, in accordance with an example implementation. One or more equipment or equipment systems 1401-1, 1401-2, 1401-3, and 1401-4 are communicatively coupled to a network 1400 which is connected to a management apparatus 1402. The management apparatus 1402 manages a database 103, which contains data aggregated from the equipment and equipment systems in the network 1400. In alternate example implementations, the data from the equipment and equipment systems 1401-1, 1401-2, 1401-3, and 1401-4 can be aggregated to a central repository or central database such as proprietary databases that aggregate data from equipment or equipment systems such as enterprise resource planning systems, and the management apparatus 1402 can access or retrieve the data from the central repository or central database.

Figure 15:
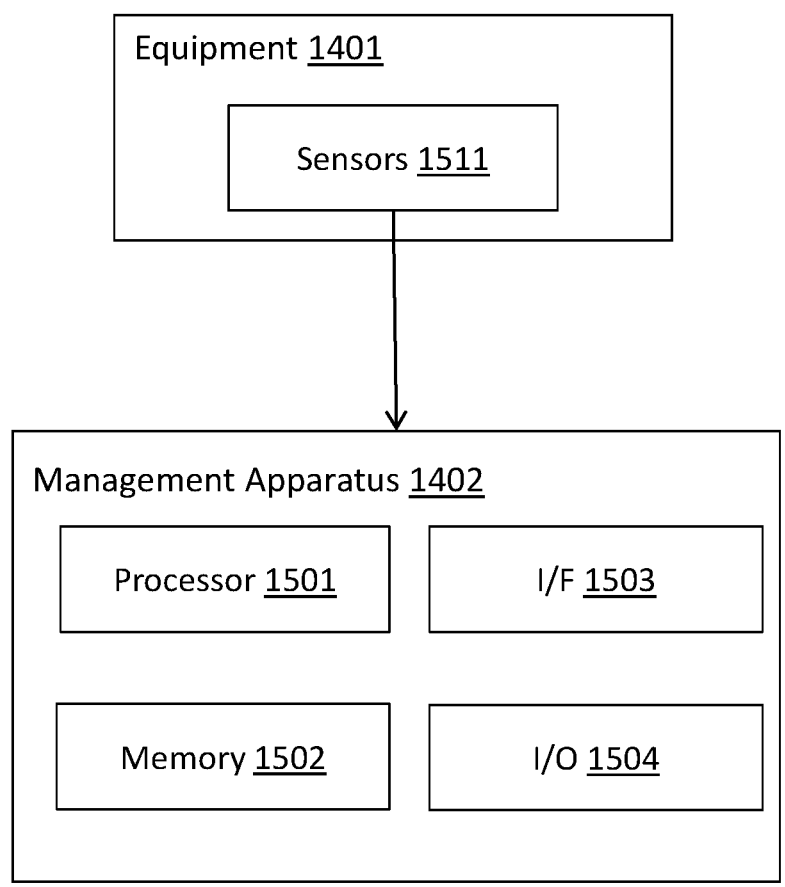
FIG. 15 illustrates an example system diagram upon which example implementations can be implemented.

FIG. 15 illustrates an example system diagram upon which example implementations can be implemented. In this example, there is a managing apparatus 1402 communicatively coupled to a plurality of sensors 1511 of an equipment or equipment system 1401. The equipment may include a plurality of sensors 1511. The sensors can be individual sensors placed within the equipment 1401, or can be an array of sensors coupled to the equipment 1401, or can be implemented in other ways in accordance with a desired implementation. In the example depicted of FIG. 15, the equipment 1401 is depicted as external from the managing apparatus 1402, however other implementations are also possible. For example, the managing apparatus 1402 can be implemented within the equipment 1401 and be configured to provide the results to an external server.

In another example implementation, managing apparatus 1402 may be configured to be communicatively coupled to another managing apparatus configured to manage and execute maintenance actions on equipment 1401 locally. For example, the another managing apparatus may be in the form of a local control system that controls the maintenance actions on the equipment 1401 associated with the another managing apparatus and is communicatively coupled to managing apparatus 1402. In such an example implementation, the another managing apparatus can be configured to execute a desired maintenance action on the equipment 1401 based on the overall performance impact of the maintenance action as provided by the managing apparatus 1402. The operator of the another managing apparatus can submit a request for a maintenance action on the another managing apparatus, which is then processed as the first maintenance action in the managing apparatus 1402. When the overall performance impact is transmitted back to the another managing apparatus, the another managing apparatus can be configured to execute the maintenance action if the overall performance impact indicates that the impact will result in performance enhancement, and can be configured to not execute the maintenance action and display to the operator the expected performance degradation or lack of performance enhancement of the proposed maintenance action.

Apparatus 1402 may include processor 1501, memory 1502, network interface (I/F) 1503 and input/output (I/O) interface 1504. Processor 1501 is configured to load one or more programs from memory 1502 and execute them to facilitate the functionality (e.g. all or a set of the modules) as described in the example implementations. Memory 1502 may also be configured to store sensor data of the equipment 1401, which can be retrieved from an external database or from storage devices.

Processor 1501 is configured to process a first maintenance action for one or more equipment. The first maintenance action can be a proposed maintenance action or set of proposed maintenance actions from an operator, or a maintenance action or set of maintenance actions submitted by an apparatus that manages the one or more equipment. Processor 1501 can be configured to obtain sensor data of the one or more equipment before and after one or more second maintenance actions that is a same type as the first maintenance action. The second maintenance actions can be one or more historical maintenance actions that are an identical type to the proposed maintenance action or set of proposed maintenance actions and can include sensor readings before the maintenance action and after the maintenance action as determined by the timestamps of the attribute values compared to the time stamp of the maintenance action as determined from FIGS. 12(a) to 12(c) and FIGS. 13(a) to 13(b). Processor may also be configured to determine an overall performance impact of the first maintenance action based on a comparison of one or more first performance determinations from the sensor data occurring before the one or more second maintenance actions and one or more second performance determinations from the sensor data occurring after the one or more second maintenance actions as illustrated in the example implementations of FIGS. 4-11. Processor 1501 may then transmit the overall performance impact in accordance with the desired implementation, which can include an aggregation of the comparisons of the one or more first performance determinations and the one or more second performance determinations.

Processor 1501 may also be configured to determine the one or more first performance determinations and the one or more second performance determinations from applying the sensor data on a key performance indicator function associated with the type of maintenance action, the key performance indicator function configured to normalize a load applied to the one or more equipment as illustrated in the example implementations of FIGS. 4-11. The processor 1501 may be configured determine the overall performance impact by running a significance test on the comparison of the one or more first performance determinations and the one or more second performance determinations, wherein the significance test is configured to indicate statistical significance between the one or more first performance determinations and the one or more second performance determinations as illustrated in FIGS. 8 and 9. Further, processor may be configured to transmit the overall performance impact by: for the significance test indicative of enhancement and degradation within a threshold of the significance test, indicate no change in performance; for the significance test indicative of degradation exceeding the threshold of the significance test and enhancement within the threshold of the significance test, indicating performance degradation; for the significance test indicative of degradation within the threshold of the significance test and enhancement exceeding the threshold of the significance test, indicating performance enhancement; and for the significance test indicative of degradation exceeding the threshold of the significance test and enhancement exceeding the threshold of the significance test, indicating mixed enhancement and degradation as illustrated in Table 3.

Managing apparatus 1402 may also be configured to conduct performance monitoring of equipment and to transmit an alert should the performance fall below a threshold as described in FIGS. 1(b), 7(a) and 7(b). Processor 1501 is configured to derive an ideal density function for a first key performance indicator (KPI) value of the apparatus, based on the historical sensor data of the equipment 1401, and derive a first model relating a first KPI value to a load of the equipment 1401 based on the historical sensor data of the equipment 1401 as illustrated, for example, in FIGS. 6(a), 6(b) and 7. For the equipment 1401 providing sensor data to the apparatus 1402, the processor 1501 can be configured to derive a second KPI value from the sensor data of the equipment 1401 corresponding to the first KPI value; normalize the second KPI value based on the first model and a present load to the equipment 1401; and derive a density function on the normalized second KPI value as illustrated in FIGS. 6(a), 6(b) and 7. When a cumulative probability of the second KPI value falling above a threshold value determined based on the ideal density function of the first KPI, the processor 1501 can be configured to provide a maintenance alert based on the threshold value. In this example implementation, the maintenance alert is utilized to alert based on detected levels of degradation. Further, in this example the first model can be the ideal performance model of the equipment 1401 as related to the load on the apparatus. Thus, the ideal density function, configured to provide indication of the first ideal KPI values from the historical sensor data, can be normalized with related to load. The normalized ideal density function results can then be compared to a density function for the second current KPI values of the apparatus that is normalized to the load of the apparatus to provide an indication of how the present KPI values of the equipment 1401 differs from the ideal KPI values. Further, normalizing the second KPI value can be conducted based on the first model and a present load to the equipment 1401 can involve adjusting the second KPI value based on a value provided from the first model for the present load to the equipment 1401.

Processor 1501 is also configured to derive one or more threshold values from one or more cumulative probabilities of the ideal density function, each of the one or more cumulative probabilities associated with the first KPI value, wherein each of the one or more cumulative probabilities is associated with level for the maintenance alert, as illustrated for example in FIGS. 6(*a*), 6(*b*) 12(*a*) and 12(*b*). Each of the levels of maintenance alert can be defined by a user based on the desired threshold according to the cumulative probabilities.

Processor 1501 can be configured to derive the ideal density function and derive the density function for time periods of an operation mode of the apparatus 1402. Processor 1501 is configured to detect the operation mode by a flow as described, for example, in FIG. 2(*c*), which can include providing a condition value associated with sensor data indicative of the operation mode; calculating a first mean of values for a set of variables correlated with the variable of the operation mode condition specified by the domain expert that meet or exceed the condition value; calculating a second mean of values for the set of variables correlated with variable of the operation mode condition that are below the condition value; determining a mixture model having a first component utilizing the first mean and a second component utilizing the second mean; calculating a decision boundary value between the two components of the mixture; and utilizing the decision boundary value as a threshold for the sensor data as being in the operation mode.

Processor 1501 can also be configured to derive an ideal density function for the plurality of component KPI values; and derive the first model for each of the plurality of component KPI values. Processor 1501 is configured to derive the first model for each of the plurality of component KPI values. The second KPI value can be a composite of the plurality of component KPI values, and the processor 1501 can be configured to derive the second KPI value for a corresponding each of the plurality of component KPI values, and normalize the second KPI value for a corresponding KPI value of the plurality of component KPI values. In this example implementation, KPI values can be an aggregate score of degradation made up of component KPI values, wherein each component KPI value can correspond to an aspect or component of the equipment 1401. For example, a component KPI value can correspond to an individual sensor monitoring a specific component of the equipment 1401.

Processor 1501 is also configured to, for a cumulative probability of a component value of the second KPI value falling above a threshold value determined based on the ideal density function of the first KPI, provide a maintenance alert based on the threshold value. Thus, when the cumulative probability of a component KPI value is indicative of degradation beyond the desired threshold when compared to the ideal KPI value, then an alert can be issued corresponding to the component.

Processor 1501 can also be configured to determine a first function configured to estimate KPI values for corresponding load values based on KPI values over time periods of the apparatus being in an operation mode; and configure the first model to normalize a provided KPI value to the load of the equipment 1401 based on values provided from the first function for the load to the equipment 1401 in accordance with the FIGS. 2(*a*) and 3.

In another example implementation, managing apparatus 1402 may be configured to be communicatively coupled to another managing apparatus configured to manage and execute maintenance actions on equipment 1401 locally in the form of a local control system that monitors and controls the maintenance actions on the equipment 1401 and is communicatively coupled to managing apparatus 1402. In such an example implementation, the another managing apparatus can be configured to raise the alert for a detection of performance falling below a desired threshold. The operator of the another managing apparatus can be aware of the need for a maintenance action for the equipment 1401 and submit a request for a maintenance action on the another managing apparatus, which is then processed as the first maintenance action in the managing apparatus 1402. When the overall performance impact is transmitted back to the another managing apparatus, the another managing apparatus can be configured to execute the maintenance action if the overall performance impact indicates that the impact will result in performance enhancement, and can be configured to not execute the maintenance action and display to the operator the expected performance degradation or lack of performance enhancement of the proposed maintenance action.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
    processing a first maintenance action for one or more equipment;
    obtaining sensor data of the one or more equipment before and after one or more second maintenance actions that is a same type of maintenance action as the first maintenance action;
    determining an overall performance impact of the first maintenance action based on a comparison of one or more first performance determinations from the sensor data occurring before the one or more second maintenance actions and one or more second performance determinations from the sensor data occurring after the one or more second maintenance actions; and
    transmitting the overall performance impact;
    wherein the one or more first performance determinations and the one or more second performance determinations are determined from applying the sensor data on a key performance indicator function associated with the type of maintenance action, the key performance indicator function configured to normalize a load applied to the one or more equipment;
    wherein the transmitting the overall impact comprises transmitting the overall impact to an apparatus configured to manage the one or more equipment, wherein the first maintenance action is executed by the apparatus based on the overall performance impact;
    wherein determining the overall performance impact comprises running a significance test on the comparison of the one or more first perfomance determinations and the one or more second performance determinations, wherein the significance test is configured to indicate statistical significance between the one or more first performance determinations and the one or more second performance determinations;
    wherein the transmitting the overall performance impact comprises:
    for the significance test indicative of no enhancement and no degradation within a threshold of the significance test, indicate no change in performance;
    for the significance test indicative of degradation exceeding the threshold of the significance test and enhancement within the threshold of the significance test, indicating performance degradation;
    for the significance test indicative of degradation within the threshold of the significance test and enhancement exceeding the threshold of the significance test, indicating performance enhancement; and
    for the significance test indicative of degradation exceeding the threshold of the significance test and enhancement exceeding the threshold of the significance test, indicating mixed enhancement and degradation.

2. The method of claim 1, wherein the overall performance impact comprises an aggregation of the comparisons of the one or more first performance determinations and the one or more second performance determinations.

3. A non-transitory computer readable medium storing instructions for executing a process, the instructions comprising:
    processing a first maintenance action for one or more equipment;
    obtaining sensor data of the one or more equipment before and after one or more second maintenance actions that is a same type of maintenance action as the first maintenance action;
    determining an overall performance impact of the first maintenance action based on a comparison of one or more first performance determinations from the sensor data occurring before the one or more second maintenance actions and one or more second performance determinations from the sensor data occurring after the one or more second maintenance actions; and
    transmitting the overall performance impact;
    wherein the one or more first performance determinations and the one or more second performance determinations are determined from applying the sensor data on a key performance indicator function associated with the type of maintenance action, the key performance indicator function configured to normalize a load applied to the one or more equipment;
    wherein the transmitting the overall impact comprises transmitting the overall impact to an apparatus configured to manage the one or more equipment, wherein the first maintenance action is executed by the apparatus based on the overall performance impact;
    wherein determining the overall performance impact further comprises running a significance test on the comparison of the one or more first performance determinations and the one or more second performance determinations, wherein the significance test is configured to indicate statistical significance between the one or more first performance determinations and the one or more second performance determinations;

wherein the transmitting the overall performance impact to the apparatus configured to manage the one or more equipment comprises:

for the significance test indicative of no enhancement and no degradation within a threshold of the significance test, indicating no change in performance;

for the significance test indicative of degradation exceeding the threshold of the significance test and enhancement within the threshold of the significance test, indicating performance degradation;

for the significance test indicative of degradation within the threshold of the significance test and enhancement exceeding the threshold of the significance test, indicating performance enhancement; and for the significance test indicative of degradation exceeding the threshold of the significance test and enhancement exceeding the threshold of the significance test, indicating mixed enhancement and degradation.

4. The non-transitory computer readable medium of claim 3, wherein the overall performance impact comprises an aggregation of the comparisons of the one or more first performance determinations and the one or more second performance determinations.

5. An apparatus, comprising:
a processor, configured to:
process a first maintenance action for one or more equipment;
obtain sensor data of the one or more equipment before and after one or more second maintenance actions that is a same type of maintenance action as the first maintenance action;
determine an overall performance impact of the first maintenance action based on a comparison of one or more first performance determinations from the sensor data occurring before the one or more second maintenance actions and one or more second performance determinations from the sensor data occurring after the one or more second maintenance actions; and
transmit the overall performance impact;
wherein the processor is configured to determine the one or more first performance determinations and the one or more second performance determinations from applying the sensor data on a key performance indicator function associated with the type of maintenance action, the key performance indicator function configured to normalize a load applied to the one or more equipment;

wherein the processor is configured to transmit the overall impact by transmitting the overall impact to another apparatus configured to manage the one or more equipment, wherein the first maintenance action is executed by the another apparatus based on the overall performance impact;

wherein the processor is configured to determine the overall performance impact by running a significance test on the comparison of the one or more first performance determinations and the one or more second performance determinations, wherein the significance test is configured to indicate statistical significance between the one or more first performance determinations and the one or more second performance determinations;

wherein the processor is configured to transmit the overall performance impact to the another apparatus configured to manage the one or more equipment by:

for the significance test indicative of no enhancement and no degradation within a threshold of the significance test, indicate no change in performance;

for the significance test indicative of degradation exceeding the threshold of the significance test and enhancement within the threshold of the significance test, indicating performance degradation;

for the significance test indicative of degradation within the threshold of the significance test and enhancement exceeding the threshold of the significance test, indicating performance enhancement; and for the significance test indicative of degradation exceeding the threshold of the significance test and enhancement exceeding the threshold of the significance test, indicating mixed enhancement and degradation.

6. The apparatus of claim 5, wherein the overall performance impact comprises an aggregation of the comparisons of the one or more first performance determinations and the one or more second performance determinations.

* * * * *